(12) United States Patent  
Akagi et al.

(10) Patent No.: US 11,025,801 B2  
(45) Date of Patent: Jun. 1, 2021

(54) IMAGE READING APPARATUS WITH DETECTION OF ABNORMAL PIXELS

(71) Applicant: CANON KABUSHIKI KAISHA, Tokyo (JP)

(72) Inventors: Daisuke Akagi, Tokyo (JP); Katsuhiro Ishido, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 16/721,242

(22) Filed: Dec. 19, 2019

(65) Prior Publication Data

US 2020/0128152 A1   Apr. 23, 2020

Related U.S. Application Data

(63) Continuation of application No. 16/201,845, filed on Nov. 27, 2018, now Pat. No. 10,567,621, which is a (Continued)

(30) Foreign Application Priority Data

May 13, 2016   (JP) ................................. 2016-096752

(51) Int. Cl.  
*H04N 1/04* (2006.01)  
*H04N 1/62* (2006.01)  
(Continued)

(52) U.S. Cl.  
CPC .......... *H04N 1/62* (2013.01); *H04N 1/00013* (2013.01); *H04N 1/00023* (2013.01); (Continued)

(58) Field of Classification Search  
None  
See application file for complete search history.

(56) References Cited

U.S. PATENT DOCUMENTS

| 4,994,907 | A | 2/1991 | Allen | 358/41 |
| 5,587,814 | A | 12/1996 | Mihara et al. | 358/512 |

(Continued)

FOREIGN PATENT DOCUMENTS

| CN | 102377906 | 3/2012 |
| CN | 103533211 | 1/2014 |

(Continued)

OTHER PUBLICATIONS

Extended European Search Report dated Oct. 5, 2017, in counterpart European Application No. 17170758.1.

(Continued)

*Primary Examiner* — Thomas D Lee  
(74) *Attorney, Agent, or Firm* — Venable LLP

(57) ABSTRACT

An original image is read as an aggregate of a plurality of pixels in which adjacent pixels have different colors (R, G, and B) in a main scanning direction and in a sub-scanning direction, and the read pixels of the respective colors are stored in a line memory in association with information on relative positions of the pixels with respect to another pixel. Then, the stored pixels are sorted so that pixels having the same color are adjacent to each other, and an abnormal pixel (dust) not present in the original image is detected based on the state of the sorted pixels. With this, the dust not present in the original image is detected without increasing the cost, and the dust is corrected without forming a conspicuous trace of correction.

10 Claims, 27 Drawing Sheets

Related U.S. Application Data continuation of application No. 15/589,327, filed on May 8, 2017, now Pat. No. 10,171,708.

(51) Int. Cl.
| | | |
|---|---|---|
| *H04N 1/028* | (2006.01) | |
| *H04N 1/40* | (2006.01) | |
| *H04N 1/409* | (2006.01) | |
| *H04N 1/00* | (2006.01) | |
| *H04N 1/10* | (2006.01) | |
| *H04N 1/193* | (2006.01) | |
| *H04N 1/48* | (2006.01) | |

(52) U.S. Cl.
CPC ..... *H04N 1/00037* (2013.01); *H04N 1/00084* (2013.01); *H04N 1/028* (2013.01); *H04N 1/02815* (2013.01); *H04N 1/1017* (2013.01); *H04N 1/1932* (2013.01); *H04N 1/40* (2013.01); *H04N 1/40093* (2013.01); *H04N 1/4097* (2013.01); *H04N 1/486* (2013.01); *H04N 2201/0081* (2013.01)

(56) References Cited

U.S. PATENT DOCUMENTS

| | | | | |
|---|---|---|---|---|
| 7,058,236 | B2 | 6/2006 | Ohashi | 382/275 |
| 7,782,503 | B2 | 8/2010 | Ishido et al. | 358/498 |
| 8,018,631 | B2 | 9/2011 | Kagami | 358/486 |
| 8,705,153 | B2 | 4/2014 | Ishido | 358/509 |
| 10,171,708 | B2 * | 1/2019 | Akagi | H04N 1/00037 |
| 10,567,621 | B2 * | 2/2020 | Akagi | H04N 1/486 |
| 2002/0176634 | A1 | 11/2002 | Ohashi | 382/275 |
| 2006/0098248 | A1 | 5/2006 | Suzuki et al. | 358/496 |
| 2009/0009828 | A1 | 1/2009 | Kagami | 358/498 |
| 2011/0242628 | A1 | 10/2011 | Morikawa et al. | 358/504 |
| 2012/0044515 | A1 | 2/2012 | Ikegawa | 358/1.13 |
| 2013/0003149 | A1 | 1/2013 | Murakami | 358/518 |
| 2014/0009802 | A1 | 1/2014 | Tanaka | H04N 1/4097 |
| 2016/0028922 | A1 | 1/2016 | Morikawa | H04N 1/4097 |
| 2017/0331983 | A1 | 11/2017 | Ishido et al. | H04N 1/58 |

FOREIGN PATENT DOCUMENTS

| | | |
|---|---|---|
| JP | H08-116402 | 5/1996 |
| JP | H10-42097 | 2/1998 |
| JP | 2002-354213 | 12/2002 |
| JP | 2003-298817 | 10/2003 |
| JP | 2004-328200 | 11/2004 |
| JP | 2009-033704 | 2/2009 |

OTHER PUBLICATIONS

CN Office Action dated Feb. 3, 2019 in counterpart Chinese Patent Application No. 201710319174.8 with English translation.
KR Office Action dated Aug. 31, 2019 in counterpart KR Application No. 10-2017-0058500 with English translation.
Office Action in counterpart EP Application No. 17170758.1, dated Jun. 26, 2020.
Office Action dated dated Sep. 29, 2020 in counterpart Japanese Application No. 2016-096752, together with English translation thereof.

* cited by examiner

FIG. 9A
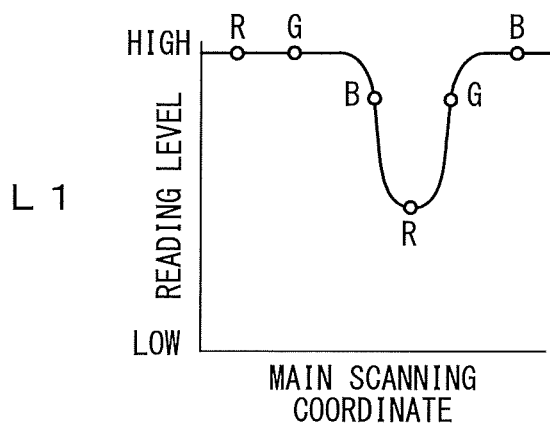
L 1
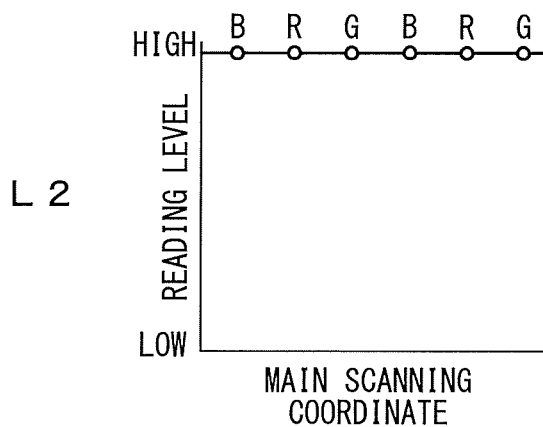
L 2
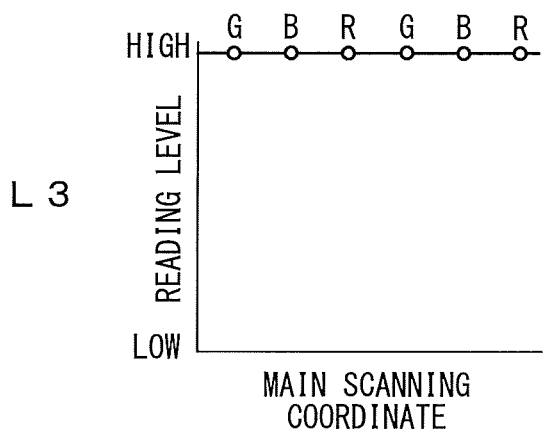
L 3
FIG. 9B
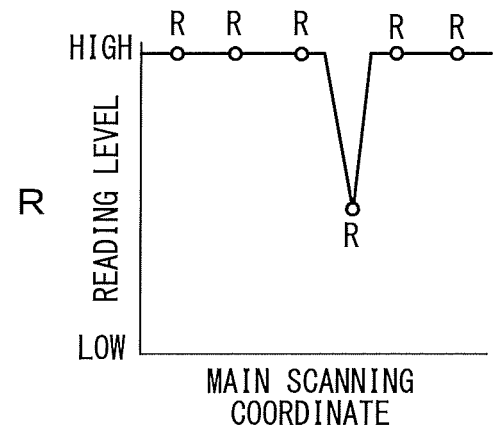
R
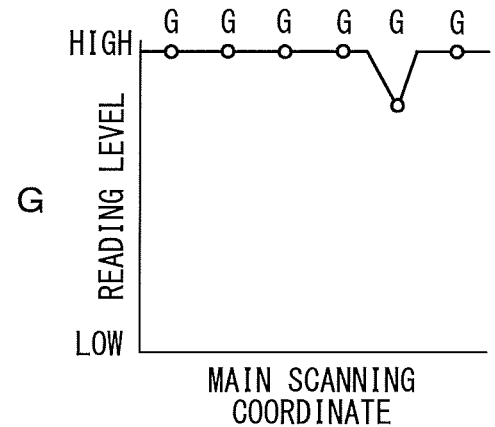
G
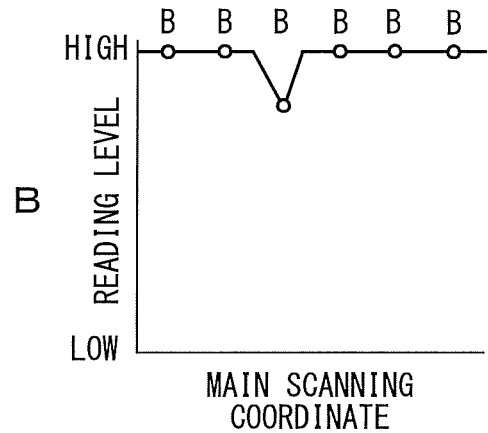
B

LINE IN ORIGINAL:
ONE PIXEL

FIG. 11A
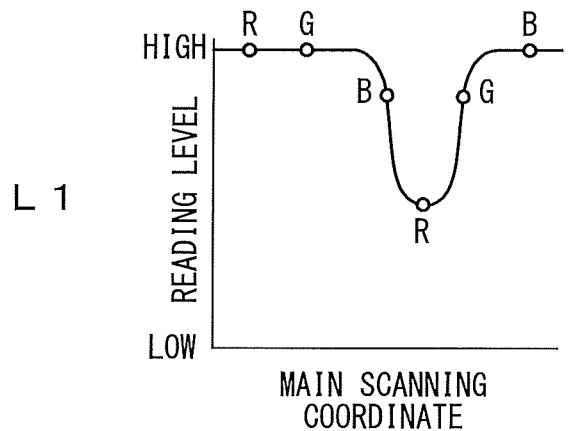
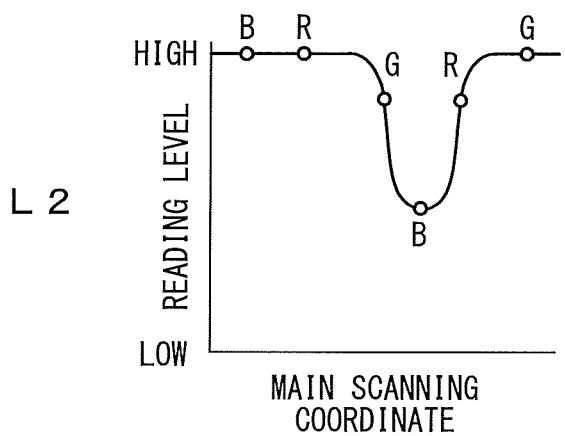
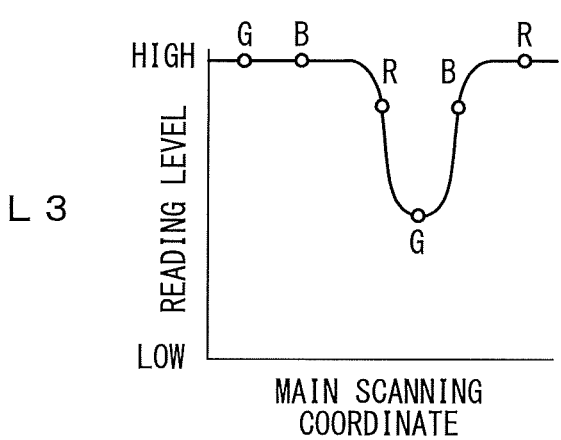
FIG. 11B
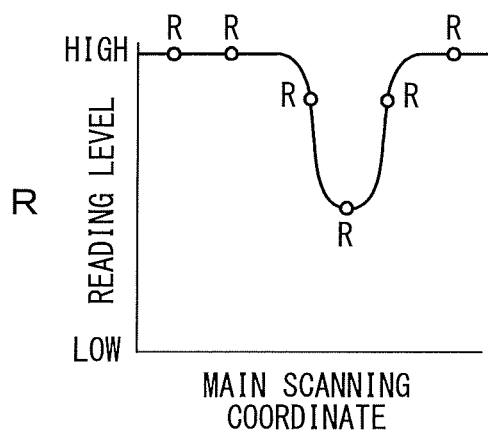
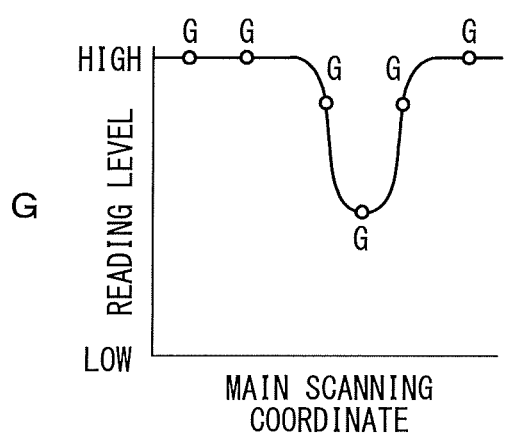
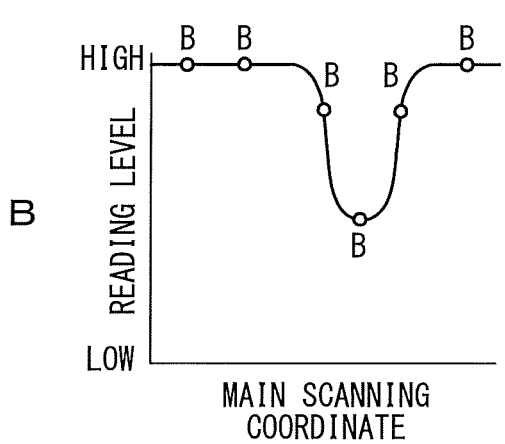

FIG. 12A
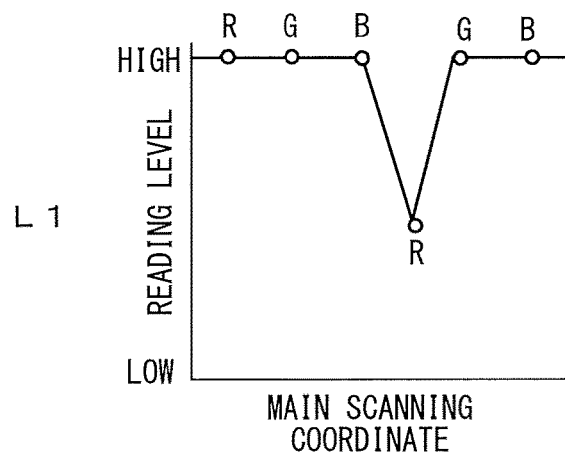
L 1
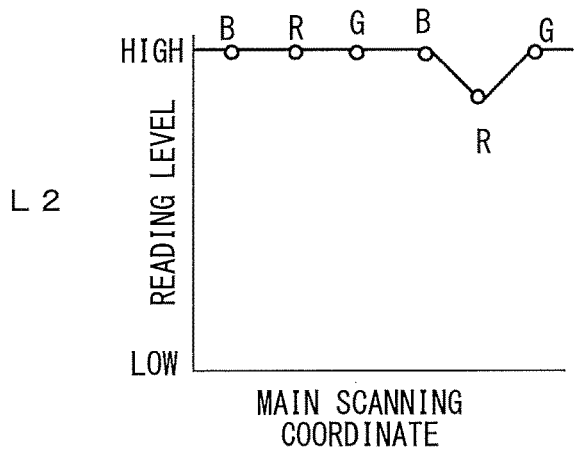
L 2
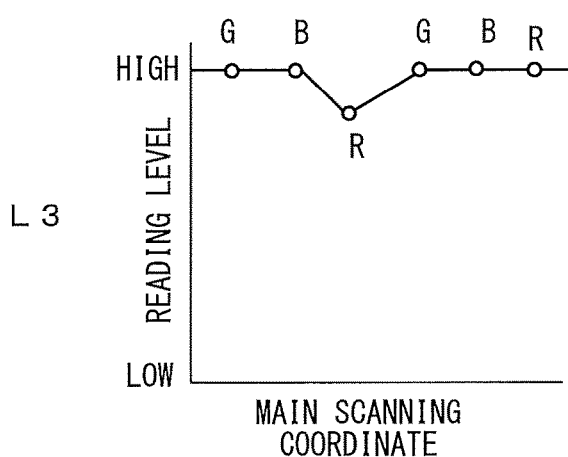
L 3
FIG. 12B
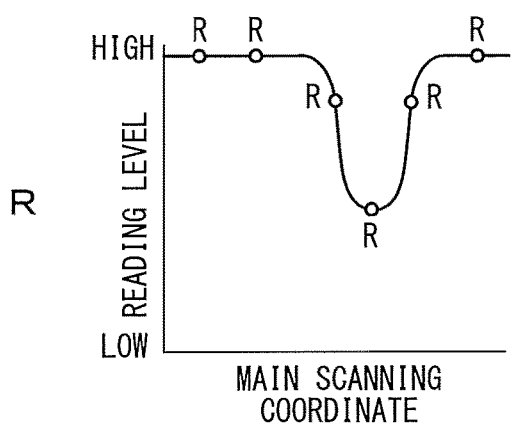
R
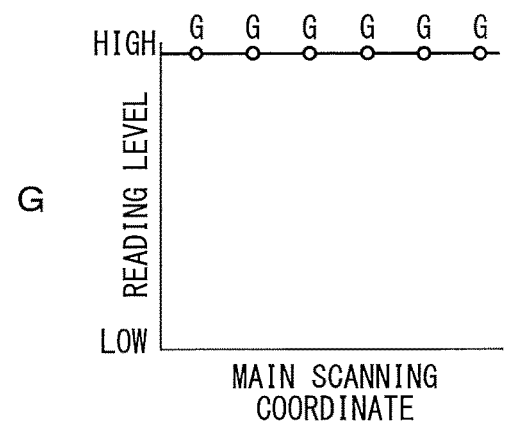
G
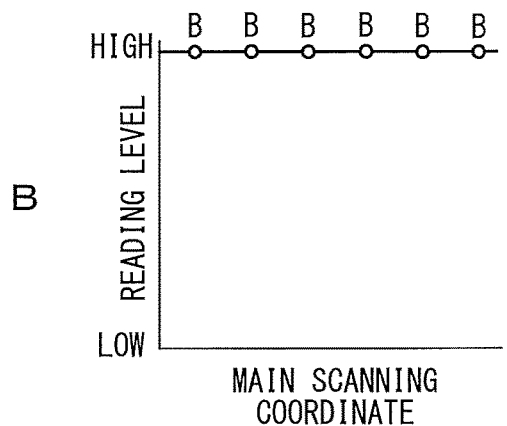
B

LINE CAUSED BY DUST
LINE IN ORIGINAL

ACCUMULATIVE ADDITION VALUE OF HISTOGRAM GENERATION CIRCUIT

MAIN SCANNING POSITION

DUST CANDIDATE FLAG

MAIN SCANNING POSITION

DUST FLAG

MAIN SCANNING POSITION

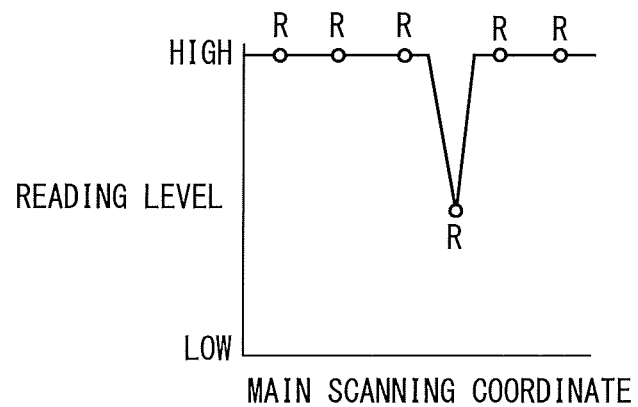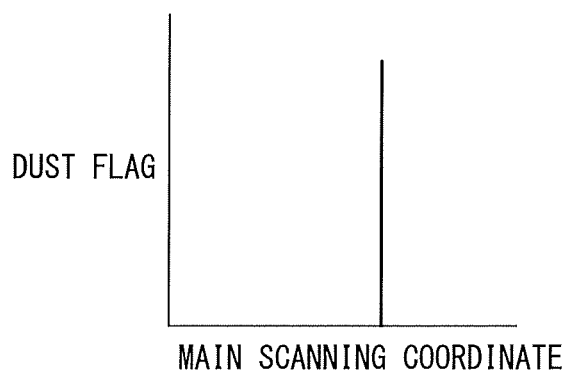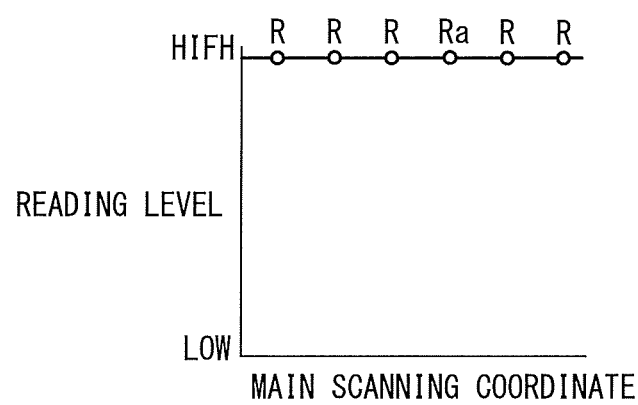
FIG. 15

FIG. 20A
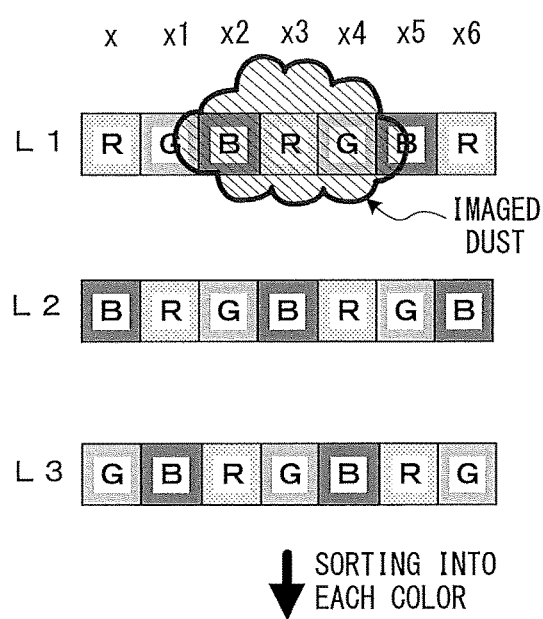
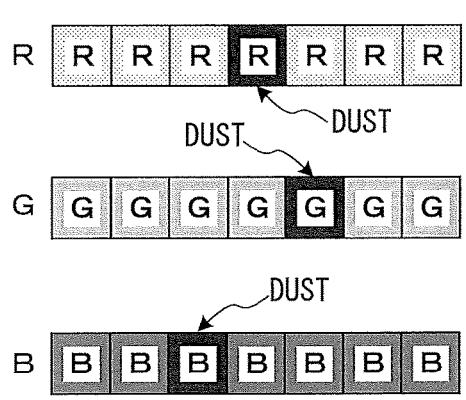
FIG. 20B
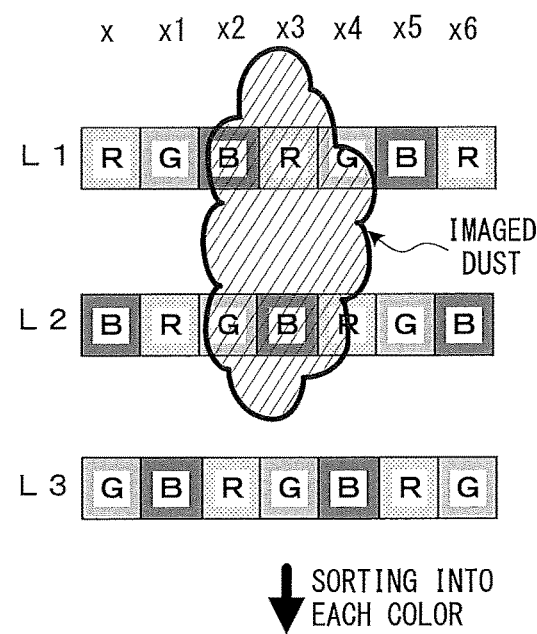
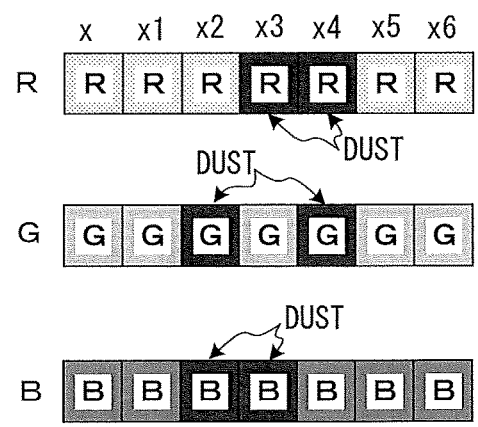

FIG. 26A

| x | x1 | x2 | x3 | x4 | x5 | x6 | x7 | x8 | x9 | x10 | x11 | x12 | x13 |
|---|---|---|---|---|---|---|---|---|---|---|---|---|---|
| L1 | 50 | 50 | 50 | 50 | 22 | 50 | 50 | 50 | 30 | 50 | 50 | 50 | 26 | 50 |
| L2 | 50 | 50 | 50 | 50 | 50 | 37 | 50 | 50 | 20 | 26 | 50 | 50 | 25 | 50 |
| L3 | 50 | 50 | 50 | 50 | 22 | 33 | 50 | 50 | 20 | 26 | 50 | 50 | 23 | 50 |
| L4 | 50 | 32 | 50 | 50 | 50 | 50 | 50 | 50 | 19 | 30 | 50 | 50 | 50 | 50 |
| L5 | 50 | 33 | 50 | 50 | 50 | 50 | 50 | 50 | 19 | 50 | 50 | 50 | 23 | 50 |
| L6 | 50 | 35 | 50 | 50 | 50 | 50 | 50 | 50 | 19 | 28 | 50 | 50 | 50 | 50 |
| L7 | 50 | 50 | 50 | 50 | 50 | 24 | 50 | 50 | 50 | 50 | 50 | 50 | 23 | 50 |
| L8 | 50 | 50 | 50 | 50 | 22 | 50 | 50 | 50 | 17 | 27 | 50 | 50 | 50 | 50 |
| L9 | 50 | 50 | 50 | 50 | 50 | 50 | 50 | 50 | 18 | 50 | 50 | 50 | 50 | 20 |
| L10 | 50 | 50 | 50 | 50 | 30 | 50 | 50 | 50 | 17 | 27 | 50 | 50 | 26 | 20 |
| L11 | 25 | 50 | 50 | 50 | 23 | 50 | 50 | 50 | 17 | 20 | 50 | 50 | 26 | 20 |
| L12 | 29 | 20 | 50 | 50 | 26 | 39 | 50 | 50 | 50 | 50 | 50 | 50 | 26 | 50 |
| L13 | 50 | 50 | 50 | 50 | 26 | 35 | 50 | 50 | 18 | 14 | 50 | 50 | 26 | 50 |
| L14 | 50 | 50 | 50 | 50 | 26 | 38 | 50 | 50 | 16 | 50 | 50 | 50 | 26 | 50 |
| L15 | 50 | 50 | 50 | 50 | 26 | 38 | 50 | 50 | 16 | 26 | 50 | 50 | 50 | 50 |
| L16 | 50 | 50 | 50 | 50 | 23 | 36 | 50 | 50 | 15 | 26 | 50 | 50 | 50 | 50 |

FIG. 26B

| x | x1 | x2 | x3 | x4 | x5 | x6 | x7 | x8 | x9 | x10 | x11 | x12 | x13 |
|---|---|---|---|---|---|---|---|---|---|---|---|---|---|
| L1 | 50 | 50 | 50 | 50 | 22 | 50 | 50 | 50 | 30 | 50 | 50 | 50 | 26 | 50 |
| L2 | 50 | 50 | 50 | 50 | 50 | 37 | 50 | 50 | 20 | 27 | 50 | 50 | 25 | 50 |
| L3 | 50 | 50 | 50 | 50 | 22 | 33 | 50 | 50 | 20 | 26 | 50 | 50 | 23 | 50 |
| L4 | 50 | 32 | 50 | 50 | 50 | 50 | 50 | 50 | 19 | 31 | 50 | 50 | 50 | 50 |
| L5 | 50 | 33 | 50 | 50 | 50 | 50 | 50 | 50 | 19 | 50 | 50 | 50 | 23 | 50 |
| L6 | 50 | 35 | 50 | 50 | 50 | 50 | 50 | 50 | 19 | 31 | 50 | 50 | 50 | 50 |
| L7 | 50 | 50 | 50 | 50 | 50 | 24 | 50 | 50 | 50 | 50 | 50 | 50 | 23 | 50 |
| L8 | 50 | 50 | 50 | 50 | 22 | 50 | 50 | 50 | 17 | 27 | 50 | 50 | 50 | 50 |
| L9 | 50 | 50 | 50 | 50 | 50 | 50 | 50 | 50 | 18 | 50 | 50 | 50 | 50 | 20 |
| L10 | 50 | 50 | 50 | 50 | 30 | 50 | 50 | 50 | 17 | 27 | 50 | 50 | 26 | 20 |
| L11 | 25 | 50 | 50 | 50 | 23 | 50 | 50 | 50 | 17 | 20 | 50 | 50 | 26 | 20 |
| L12 | 29 | 20 | 50 | 50 | 26 | 39 | 50 | 50 | 50 | 50 | 50 | 50 | 26 | 50 |
| L13 | 50 | 50 | 50 | 50 | 26 | 35 | 50 | 50 | 18 | 14 | 50 | 50 | 26 | 50 |
| L14 | 50 | 50 | 50 | 50 | 26 | 38 | 50 | 50 | 16 | 50 | 50 | 50 | 26 | 50 |
| L15 | 50 | 50 | 50 | 50 | 26 | 38 | 50 | 50 | 16 | 26 | 50 | 50 | 50 | 50 |
| L16 | 50 | 50 | 50 | 50 | 23 | 36 | 50 | 50 | 15 | 26 | 50 | 50 | 50 | 50 |

FIG. 26D

| x | x1 | x2 | x3 | x4 | x5 | x6 | x7 | x8 | x9 | x10 | x11 | x12 | x13 |
|---|---|---|---|---|---|---|---|---|---|---|---|---|---|
| L1 | 100 | 100 | 100 | 72 | 72 | 100 | 100 | 80 | 80 | 100 | 100 | 76 | 76 | -- |
| L2 | 100 | 100 | 100 | 100 | 87 | 87 | 100 | 70 | 46 | 76 | 100 | 75 | 75 | -- |
| L3 | 100 | 100 | 100 | 72 | 55 | 83 | 100 | 70 | 46 | 76 | 100 | 73 | 73 | -- |
| L4 | 82 | 82 | 100 | 100 | 100 | 100 | 100 | 69 | 49 | 80 | 100 | 100 | 100 | -- |
| L5 | 83 | 83 | 100 | 100 | 100 | 100 | 100 | 69 | 69 | 100 | 100 | 73 | 73 | -- |
| L6 | 85 | 85 | 100 | 100 | 100 | 100 | 100 | 69 | 47 | 78 | 100 | 100 | 100 | -- |
| L7 | 100 | 100 | 100 | 100 | 74 | 74 | 100 | 100 | 100 | 100 | 100 | 73 | 73 | -- |
| L8 | 100 | 100 | 100 | 72 | 72 | 100 | 100 | 67 | 44 | 77 | 100 | 100 | 100 | -- |
| L9 | 100 | 100 | 100 | 100 | 100 | 100 | 100 | 68 | 68 | 100 | 100 | 100 | 70 | -- |
| L10 | 100 | 100 | 100 | 80 | 80 | 100 | 100 | 67 | 44 | 77 | 100 | 76 | 46 | -- |
| L11 | 75 | 100 | 100 | 73 | 73 | 100 | 100 | 67 | 37 | 70 | 100 | 76 | 46 | -- |
| L12 | 49 | 70 | 100 | 76 | 65 | 89 | 100 | 100 | 100 | 100 | 100 | 76 | 76 | -- |
| L13 | 100 | 100 | 100 | 76 | 61 | 85 | 100 | 68 | 32 | 64 | 100 | 76 | 76 | -- |
| L14 | 100 | 100 | 100 | 76 | 64 | 88 | 100 | 66 | 66 | 100 | 100 | 76 | 76 | -- |
| L15 | 100 | 100 | 100 | 76 | 64 | 88 | 100 | 66 | 42 | 76 | 100 | 100 | 100 | -- |
| L16 | 100 | 100 | 100 | 73 | 59 | 86 | 100 | 65 | 41 | 76 | 100 | 100 | 100 | -- |

FIG. 26C

| x | x1 | x2 | x3 | x4 | x5 | x6 | x7 | x8 | x9 | x10 | x11 | x12 | x13 |
|---|---|---|---|---|---|---|---|---|---|---|---|---|---|
| L1 | 0 | 0 | 0 | 0 | 1 | 0 | 0 | 0 | 1 | 0 | 0 | 0 | 1 | 0 |
| L2 | 0 | 0 | 0 | 0 | 0 | 0 | 0 | 0 | 1 | 1 | 0 | 0 | 1 | 0 |
| L3 | 0 | 0 | 0 | 0 | 1 | 1 | 0 | 0 | 1 | 1 | 0 | 0 | 1 | 0 |
| L4 | 0 | 1 | 0 | 0 | 0 | 0 | 0 | 0 | 1 | 1 | 0 | 0 | 0 | 0 |
| L5 | 0 | 1 | 0 | 0 | 0 | 0 | 0 | 0 | 1 | 0 | 0 | 0 | 1 | 0 |
| L6 | 0 | 1 | 0 | 0 | 0 | 0 | 0 | 0 | 1 | 1 | 0 | 0 | 0 | 0 |
| L7 | 0 | 0 | 0 | 0 | 0 | 1 | 0 | 0 | 0 | 0 | 0 | 0 | 1 | 0 |
| L8 | 0 | 0 | 0 | 0 | 1 | 0 | 0 | 0 | 1 | 1 | 0 | 0 | 0 | 0 |
| L9 | 0 | 0 | 0 | 0 | 0 | 0 | 0 | 0 | 1 | 0 | 0 | 0 | 0 | 1 |
| L10 | 0 | 0 | 0 | 0 | 1 | 0 | 0 | 0 | 1 | 1 | 0 | 0 | 1 | 1 |
| L11 | 1 | 0 | 0 | 0 | 1 | 0 | 0 | 0 | 1 | 1 | 0 | 0 | 1 | 1 |
| L12 | 1 | 1 | 0 | 0 | 1 | 0 | 0 | 0 | 0 | 0 | 0 | 0 | 1 | 0 |
| L13 | 0 | 0 | 0 | 0 | 1 | 0 | 0 | 0 | 1 | 1 | 0 | 0 | 1 | 0 |
| L14 | 0 | 0 | 0 | 0 | 1 | 0 | 0 | 0 | 1 | 0 | 0 | 0 | 1 | 0 |
| L15 | 0 | 0 | 0 | 0 | 1 | 0 | 0 | 0 | 1 | 1 | 0 | 0 | 0 | 0 |
| L16 | 0 | 0 | 0 | 0 | 1 | 0 | 0 | 0 | 1 | 1 | 0 | 0 | 0 | 0 |

FIG. 26E

| x | x1 | x2 | x3 | x4 | x5 | x6 | x7 | x8 | x9 | x10 | x11 | x12 | x13 |
|---|---|---|---|---|---|---|---|---|---|---|---|---|---|
| L1 | 0 | 0 | 0 | 0 | 0 | 0 | 0 | 0 | 0 | 0 | 0 | 0 | 0 | 0 |
| L2 | 0 | 0 | 0 | 0 | 0 | 0 | 0 | 0 | 1 | 0 | 0 | 0 | 0 | 0 |
| L3 | 0 | 0 | 0 | 0 | 0 | 0 | 0 | 0 | 1 | 0 | 0 | 0 | 0 | 0 |
| L4 | 0 | 0 | 0 | 0 | 0 | 0 | 0 | 0 | 1 | 0 | 0 | 0 | 0 | 0 |
| L5 | 0 | 0 | 0 | 0 | 0 | 0 | 0 | 0 | 0 | 0 | 0 | 0 | 0 | 0 |
| L6 | 0 | 0 | 0 | 0 | 0 | 0 | 0 | 0 | 1 | 0 | 0 | 0 | 0 | 0 |
| L7 | 0 | 0 | 0 | 0 | 0 | 0 | 0 | 0 | 0 | 0 | 0 | 0 | 0 | 0 |
| L8 | 0 | 0 | 0 | 0 | 0 | 0 | 0 | 0 | 1 | 0 | 0 | 0 | 0 | 0 |
| L9 | 0 | 0 | 0 | 0 | 0 | 0 | 0 | 0 | 0 | 0 | 0 | 0 | 0 | 0 |
| L10 | 0 | 0 | 0 | 0 | 0 | 0 | 0 | 0 | 1 | 0 | 0 | 0 | 1 | 0 |
| L11 | 0 | 0 | 0 | 0 | 0 | 0 | 0 | 0 | 1 | 0 | 0 | 0 | 1 | 0 |
| L12 | 1 | 0 | 0 | 0 | 0 | 0 | 0 | 0 | 0 | 0 | 0 | 0 | 0 | 0 |
| L13 | 0 | 0 | 0 | 0 | 0 | 0 | 0 | 0 | 1 | 0 | 0 | 0 | 0 | 0 |
| L14 | 0 | 0 | 0 | 0 | 0 | 0 | 0 | 0 | 0 | 0 | 0 | 0 | 0 | 0 |
| L15 | 0 | 0 | 0 | 0 | 0 | 0 | 0 | 0 | 1 | 0 | 0 | 0 | 0 | 0 |
| L16 | 0 | 0 | 0 | 0 | 0 | 0 | 0 | 0 | 1 | 0 | 0 | 0 | 0 | 0 |

FIG. 26F HISTOGRAM FOR ONE-PIXEL

| x | x1 | x2 | x3 | x4 | x5 | x6 | x7 | x8 | x9 | x10 | x11 | x12 | x13 |
|---|---|---|---|---|---|---|---|---|---|---|---|---|---|
| 2 | 1 | 0 | 0 | 10 | 1 | 0 | 0 | 14 | 8 | 0 | 0 | 10 | 3 |

FIG. 26G HISTOGRAM FOR TWO-PIXEL

| x | x1 | x2 | x3 | x4 | x5 | x6 | x7 | x8 | x9 | x10 | x11 | x12 | x13 |
|---|---|---|---|---|---|---|---|---|---|---|---|---|---|
| 1 | 0 | 0 | 0 | 0 | 0 | 0 | 0 | 10 | 0 | 0 | 0 | 2 | 0 |

FIG. 26H HISTOGRAM BINARIZATION FOR ONE-PIXEL

| x | x1 | x2 | x3 | x4 | x5 | x6 | x7 | x8 | x9 | x10 | x11 | x12 | x13 |
|---|---|---|---|---|---|---|---|---|---|---|---|---|---|
| 0 | 0 | 0 | 0 | 1 | 0 | 0 | 0 | 1 | 0 | 0 | 0 | 1 | 0 |

FIG. 26I HISTOGRAM BINARIZATION FOR TWO-PIXEL

| x | x1 | x2 | x3 | x4 | x5 | x6 | x7 | x8 | x9 | x10 | x11 | x12 | x13 |
|---|---|---|---|---|---|---|---|---|---|---|---|---|---|
| 0 | 0 | 0 | 0 | 0 | 0 | 0 | 0 | 1 | 1 | 0 | 0 | 0 | 0 |

FIG. 26J

| x | x1 | x2 | x3 | x4 | x5 | x6 | x7 | x8 | x9 | x10 | x11 | x12 | x13 |
|---|---|---|---|---|---|---|---|---|---|---|---|---|---|
| 0 | 0 | 0 | 0 | 1 | 0 | 0 | 0 | 1 | 1 | 0 | 0 | 1 | 0 |

IMAGE READING APPARATUS WITH DETECTION OF ABNORMAL PIXELS

This application is a continuation of application Ser. No. 16/201,845 filed Nov. 27, 2018, currently pending; which was a continuation of application Ser. No. 15/589,327 filed May 8, 2017, issued as U.S. Pat. No. 10,171,708 on Jan. 1, 2019; and claims priority under 35 U.S.C. § 119 to Japan Application JP 2016-096752 filed in Japan on May 13, 2016; and the contents of all of which are incorporated herein by reference as if set forth in full.

BACKGROUND OF THE INVENTION

Field of the Invention

The present invention relates to an image reading apparatus configured to effectively detect an abnormal pixel that is not present in an image of an object when the image is read, and to a method for processing an image read by the image reading apparatus.

Description of the Related Art

As an image reading apparatus to be used in a copying machine or the like, there is known an image reading apparatus configured to perform "flow-reading". In the flow-reading, while originals are conveyed one by one onto an original table glass, each original is exposed with light emitted from a light source fixed at a predetermined position for image reading. At the time of the flow-reading, when foreign matter, for example, dust adheres to the original table glass, a streak image may be formed in the read image. In order to solve such a problem, hitherto, there have been proposed a technology of automatically detecting dust adhesion when dust has adhered onto the original table glass, to thereby urge a user to clean the original table glass, and a technology of performing correction through image processing.

For example, an apparatus disclosed in Japanese Patent Application Laid-open No. 2004-328200 is configured to convert the read image into binary data, and add the binary data for each line in a sub-scanning direction, to thereby detect a black streak when the addition result is equal to or more than a predetermined value. When the black streak is detected, the image is corrected.

In the apparatus disclosed in Japanese Patent Application Laid-open No. 2004-328200, when the read original has a vertical line like a ruled line extending in the sub-scanning direction, the ruled line may be falsely detected as a black streak.

The present invention has a primary object to provide an image reading method capable of detecting an abnormal pixel with high accuracy.

SUMMARY OF THE INVENTION

According to one embodiment of the present invention, there is provided an image reading apparatus, comprising: a sensor having first and second line sensors and configured to read an image of an object, the first line sensor having a first light receiving elements and a second light receiving elements being arranged in a first direction, the first light receiving elements configured to receive light of a first color and the second light receiving elements configured to receive light of a second color that is different from the first color, the second line sensor having a third light receiving elements and a fourth light receiving elements being arranged in the first direction, the third light receiving elements configured to receive light of the first color and the fourth light receiving elements configured to receive light of the second color, and the first line sensor and the second line sensor being arranged at a predetermined interval in a second direction orthogonal to the first direction; and a detector configured to detect an abnormal pixel of the first color based on first image data of the first receiving elements and third image data of the third receiving elements, and to detect an abnormal pixel of the second color based on second image data of the second receiving elements and fourth image data of the fourth receiving elements.

Further features of the present invention will become apparent from the following description of exemplary embodiments (with reference to the attached drawings).

BRIEF DESCRIPTION OF THE DRAWINGS

FIG. 9A is a graph for showing reading results obtained before sorting, and FIG. 9B is a graph for showing reading results obtained after the sorting.

FIG. 11A is a graph for showing reading results obtained before sorting, and FIG. 11B is a graph for showing reading results obtained after the sorting.

FIG. 12A is a graph for showing results of reading a cyan line, which are obtained before sorting, and FIG. 12B is a graph for showing results of reading the cyan line, which are obtained after the sorting.

FIG. 15 is an explanatory graph for showing reading levels obtained before and after dust correction.

FIG. 20A is an explanatory diagram of a detection state of dust present across one line, and FIG. 20B is an explanatory diagram of a detection state of dust present across two lines.

FIG. 26A, FIG. 26B, FIG. 26C, FIG. 26D, FIG. 26E, FIG. 26F, FIG. 26G, FIG. 26H, FIG. 26I, and FIG. 26J are explanatory diagrams for illustrating a dust detecting step of the image reading apparatus according to the third embodiment.

DESCRIPTION OF THE EMBODIMENTS

Now, embodiments of the present invention are described in detail.

First Embodiment

Figure 1:
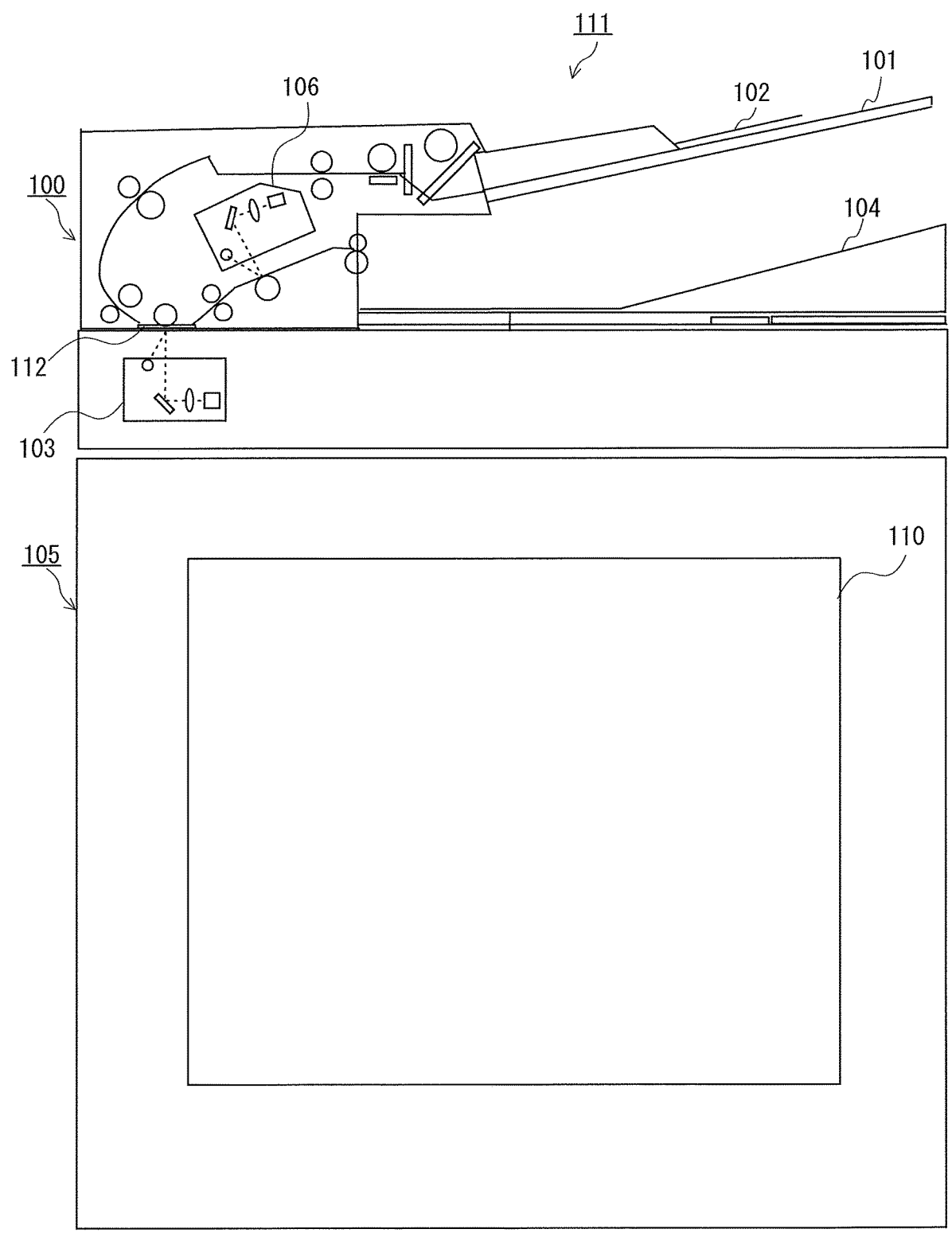
FIG. 1 is a diagram for illustrating a configuration example of an image forming apparatus according to a first embodiment of the present invention.

FIG. 1 is an illustration of a digital color multifunction peripheral, which is an example of an image forming apparatus 111 including an image reading apparatus 100 according to a first embodiment of the present invention. The image forming apparatus 111 includes the image reading apparatus 100 and an image forming apparatus main body 105.

The image forming apparatus main body 105 includes an image forming portion 110 configured to form an image by employing a known electrophotographic system. The image forming portion 110 includes a photosensitive member, an exposure device, a developing device, a transfer device, and a fixing device. The exposure device is configured to form an electrostatic latent image on the photosensitive member based on image information acquired by the image reading apparatus 100 serving as an image input portion. The developing device is configured to develop the electrostatic latent image into a developer image using toner. The transfer device is configured to transfer the developer image onto a conveyed recording medium. The fixing device is configured to fix the developer image formed on the recording medium onto the recording medium.

The image reading apparatus 100 includes an original tray 101 on which an original 102, which is an example of an object, is to be placed, and original reading units 103 and 106. The original reading units 103 and 106 are configured to covey the original 102 placed on the original tray 101 to an original table glass 112 by an original conveyance motor, to thereby read the original 102 as an original image. An original background plate is arranged on the back side of the original 102 on the original table glass 112. After the reading of the original image by the original reading units 103 and 106 ends, the image reading apparatus 100 delivers the original 102 to a sheet delivery tray 104. When only one side of the original is to be read, the image is read using the original reading unit 103, and when both sides of the original are to be read, the image is read using the original reading units 103 and 106. The original reading units 103 and 106 have the same configuration, and hence the original reading unit 106 is described as an example in the following.

Figure 2:
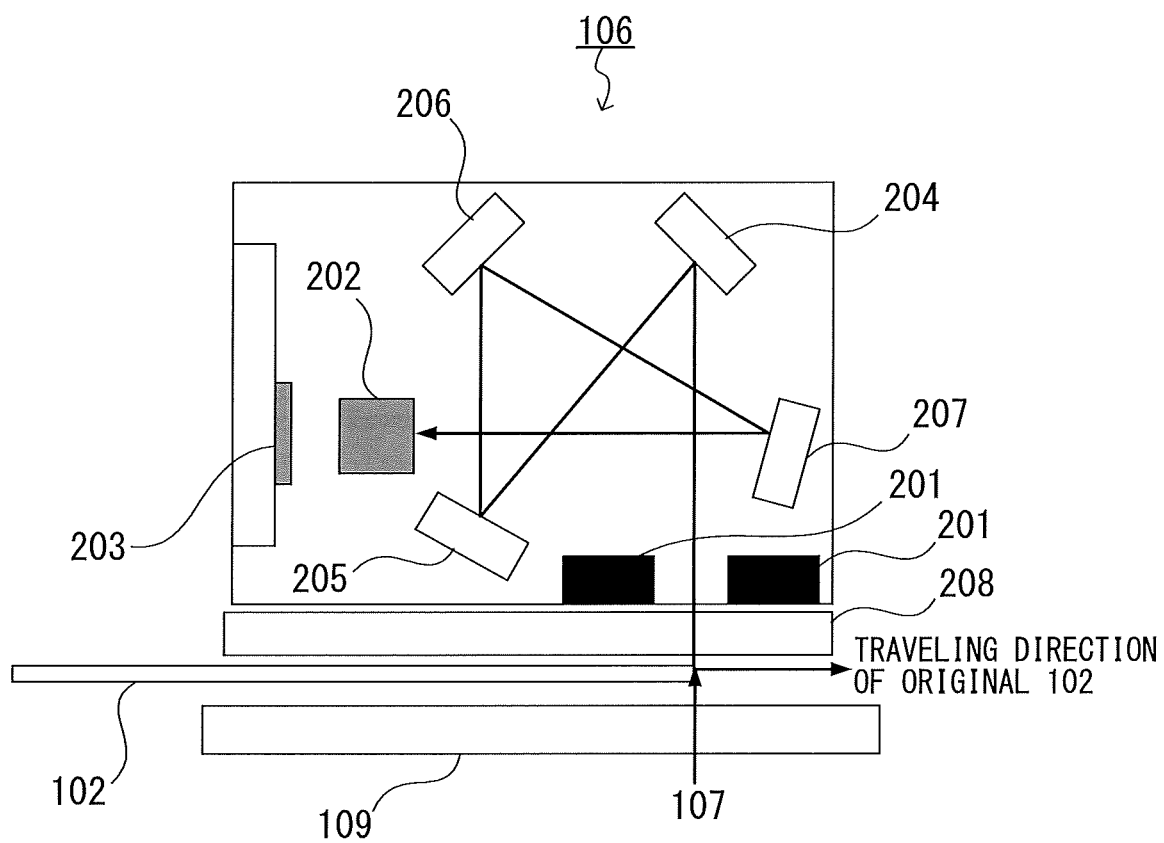
FIG. 2 is a diagram for illustrating a configuration example of an original reading unit included in the image forming apparatus.

FIG. 2 is a schematic diagram for illustrating a configuration example of the original reading unit 106. The original reading unit 106 includes a light source 201, a lens 202, a line sensor 203, and mirrors 204, 205, 206, and 207. The light source 201 is arranged at a predetermined position for radiating light toward the original 102 that passes through an original reading position 107. The mirrors 204, 205, 206, and 207 are configured to guide the light reflected from the original 102 toward the lens 202 and the line sensor 203. The line sensor 203 is configured to photoelectrically convert, using each of a plurality of light receiving elements, the light reflected from the original 102 and guided by the lens 202, to thereby output a signal corresponding to the intensity of the reflected light. The lens 202 and the mirrors 204, 205, 206, and 207 construct an optical system of the original reading unit 106. The resolution of the optical system is lower than the resolution of the line sensor 203. The reason for this is described later.

Next, the line sensor 203 is described. The line sensor 203 is, for example, a charge-coupled device (CCD) linear image sensor. In the line sensor 203, the plurality of light receiving elements configured to receive the light reflected from the original 102 are arranged. One light receiving element corresponds to one pixel. The width of one light receiving element corresponds to a one-pixel width. For example, a three-pixel width represents a width corresponding to three light receiving elements. Regarding pixels referred to when the image of the original 102 is described, an image read by a one-pixel light receiving element of the line sensor 203 is described as an image of one pixel (image having a one-pixel width). The light receiving elements include first light receiving elements configured to detect red light (first color: R), second light receiving elements configured to detect green light (second color: G), and third light receiving elements configured to detect blue light (third color: B). The respective light receiving elements for R, G, and B are periodically arranged in a predetermined direction for each one-pixel width. With this, a light receiving element row in which R→G→B is repeated in the predetermined direction is formed. The line sensor 203 is obtained by arranging a plurality of such light receiving element rows. A pixel corresponding to the light receiving element configured to receive red light is herein called "R pixel", a pixel corresponding to the light receiving element configured to receive green light is herein called "G pixel", and a pixel corresponding to the light receiving element configured to receive blue light is herein called "B pixel". Further, a row in a first direction, which is formed of the light receiving element row, is herein called "reading line". One light receiving element row forms one reading line. In the line sensor 203, a plurality of reading lines of light receiving element rows each forming one reading line are arranged at predetermined intervals in a second direction orthogonal to the first direction.

Figure 3:
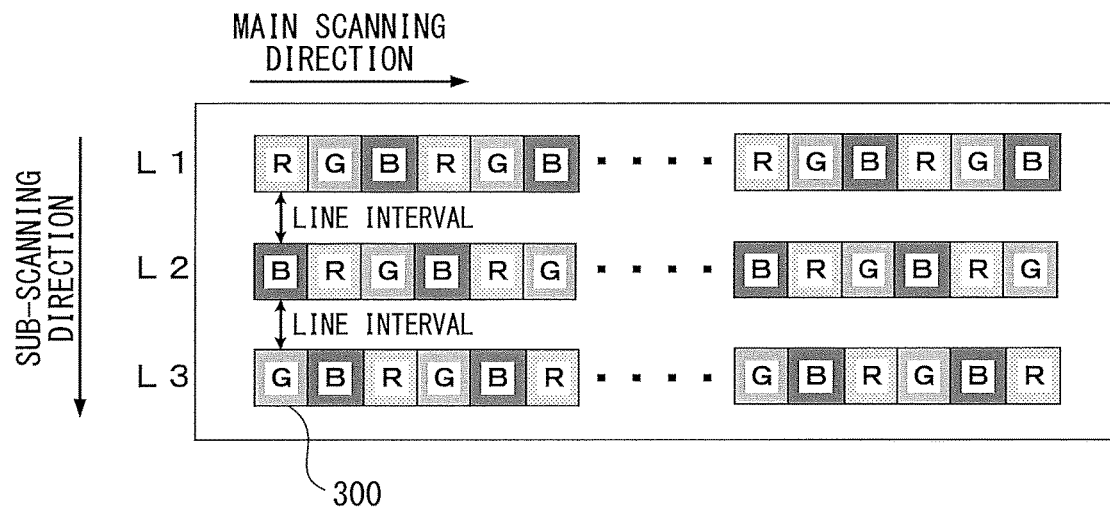
FIG. 3 is an explanatory diagram of arrangement structure of light receiving elements in a line sensor.

FIG. 3 is an explanatory diagram of an arrangement structure of the light receiving elements in the line sensor 203. The line sensor 203 is configured to read 7,500 pixels in a main scanning direction that is the first direction, and three reading lines in a sub-scanning direction that is the second direction orthogonal to the first direction. In this case, description is made assuming that the image is read at the resolution of 600 dots per inch (dpi) in the main scanning direction, but the resolution is merely an example. The main scanning direction is a direction in which the plurality of light receiving elements are arranged in one row, and is a direction corresponding to a width direction (direction orthogonal to a conveyance direction) of the original when the original is read. The sub-scanning direction is a direction orthogonal to the main scanning direction, and is a direction corresponding to the conveyance direction of the original when the original is read.

The three reading lines of light receiving element rows are separated from each other in the sub-scanning direction at predetermined pixel widths (predetermined intervals), and are arranged so that a color of a starting end pixel of the period of R→G→B in a certain row differs from that in adjacent rows. In the example of FIG. 3, the reading line interval is one pixel. Therefore, the light receiving element rows are arranged at positions separated in the sub-scanning direction by two pixels between a reading line L1 and a reading line L2, and by four pixels between the reading line L1 and a reading line L3. Further, the color of the starting end pixel of the reading line L1 is "R" (red), the color of the starting end pixel of the reading line L2 is B (blue), which is different by one pixel from R, and the color of the starting end pixel of the reading line L3 is G (green), which is different by one pixel from B. That is, in the main scanning direction, the colors of the pixels have a regularity of R→G→B→R→G→B→, . . . . As viewed in the sub-scanning direction, the reading line L1 and the reading line L2 have arrangements in which the above-mentioned regularity is shifted by one pixel in the main scanning direction. The reading line L1 and the reading line L3 have arrangements in which the above-mentioned regularity is shifted by two pixels in the main scanning direction. Therefore, in the line sensor 203, the respective light receiving elements for R, G, and B are arranged in a so-called staggered manner. That is, the first light receiving elements, the second light receiving elements, and the third light receiving elements are arranged so that the light receiving elements configured to receive light of the same color are prevented from being adjacent to each other. When the original 102 is read, the line sensor 203 outputs results of detecting signals at positions separated by the above-mentioned number of pixels.

Each of the light receiving elements of the reading lines L1, L2, and L3 includes a light transmitting member 300 in which light of a corresponding wavelength (wavelength of red light in the case of R) is set as a peak transmission wavelength, and an optical semiconductor element configured to output a signal having a level corresponding to the intensity of light transmitted through the light transmitting member 300. The light transmitting member 300 is a filter that transmits light of a corresponding color (red color in the case of R), and the optical semiconductor element is, for example, a photodiode. The peak transmission wavelength refers to a wavelength at which the transmittance of the film is the maximum. In a case of an element capable of receiving light of a corresponding color by itself, the light transmitting member 300 is unnecessary.

Figure 4:
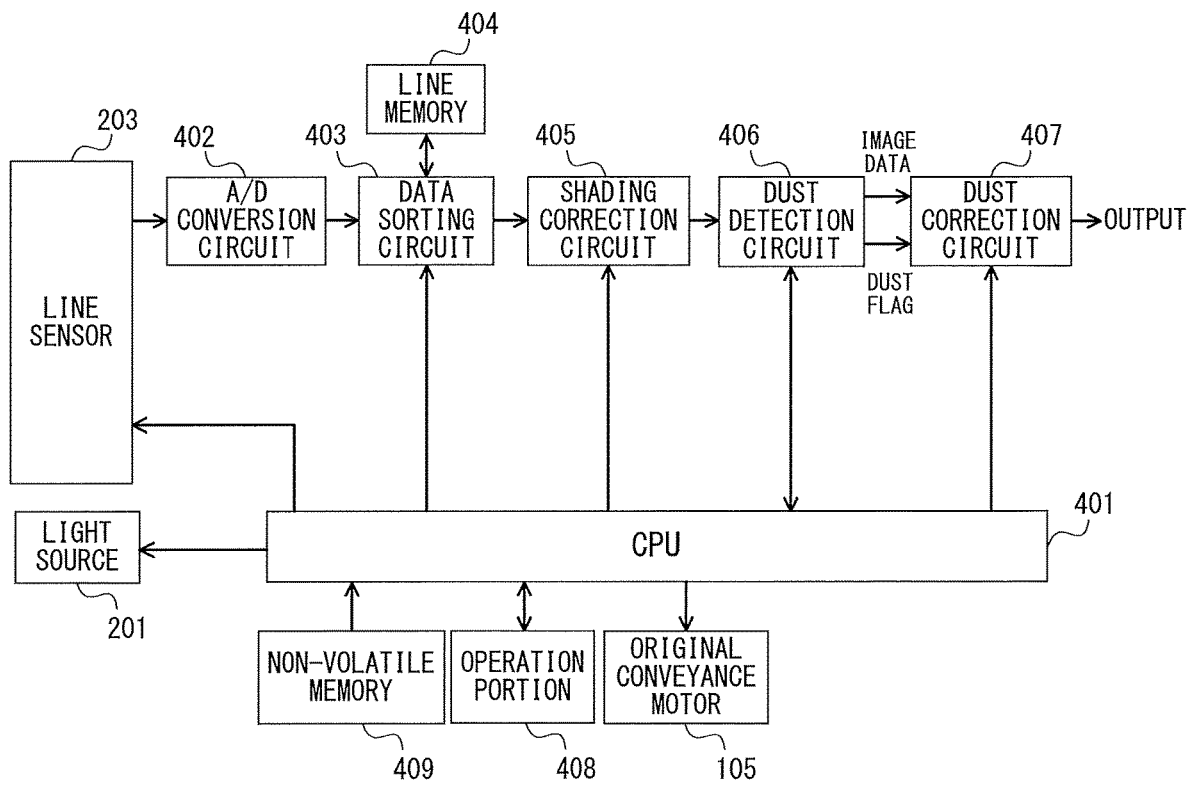
FIG. 4 is a block diagram of a control system of an image reading apparatus according to the first embodiment.

FIG. 4 is a block diagram of a control system of the image reading apparatus according to the first embodiment. The image reading apparatus includes a computer including a CPU 401 and a non-volatile memory 409 as main components. The CPU 401 reads out and executes a computer program stored in the non-volatile memory 409 so that the computer having components illustrated in FIG. 1 is caused to function as the image reading apparatus. Then, the CPU 401 executes a characteristic image reading method. The CPU 401 also controls operations of the light source 201, the line sensor 203, and an original conveyance motor 105 based on instructions from a user, which are input to an operation portion 408, to thereby control reading of the image of the original 102.

The outline of the operation of the control system is as follows. The CPU 401 controls the line sensor 203 to read an original image as an aggregate of a plurality of pixels in which adjacent pixels have different colors in each of the main scanning direction and the sub-scanning direction. The pixels of respective colors in the line sensor 203 output signals corresponding to the intensities (amounts) of light input to the respective pixels based on the light reflected from the original. This signal corresponds to information of a density of each color of the original image. The signals are analog signals, and hence are converted by an A/D conversion circuit 402 into image data being digital signals. In this case, for the sake of convenience, the A/D conversion circuit 402 is assumed to have an 8-bit resolution, but the resolution is exemplary. The CPU 401 stores the read image data of each color to a line memory 404, which corresponds to a predetermined memory, in association with information on a relative position between the image data and another piece of image data for each light receiving element row. The information on the relative position corresponds to an arrangement position of each light receiving element of the line sensor 203. When the information on the relative position corresponds to an address of the line memory 404, the address is used. A data sorting circuit 403 is a circuit serving as an example of sorting means, and is configured to sort the stored pieces of image data so that pixels having the same color are adjacent to each other and rows of same-color pixels are obtained.

Figure 5A:
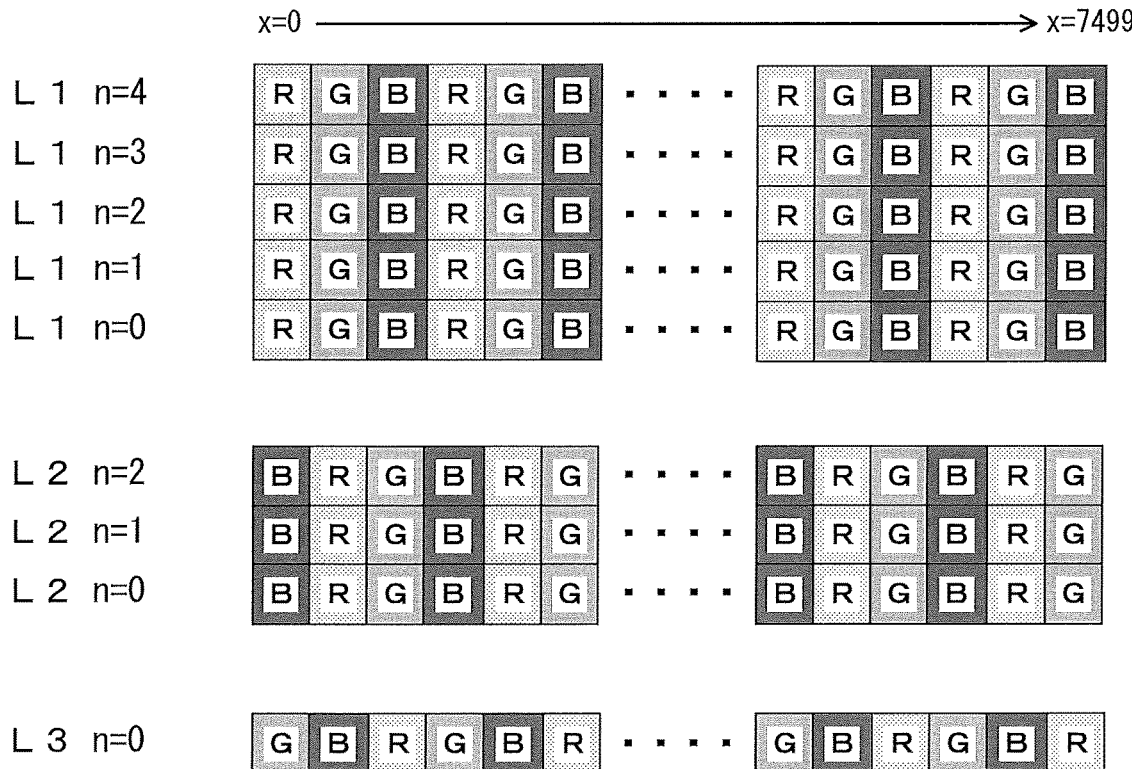
FIG. 5A and FIG. 5B are explanatory diagrams for illustrating a reading state of image data from the line memory.
Figure 5B:
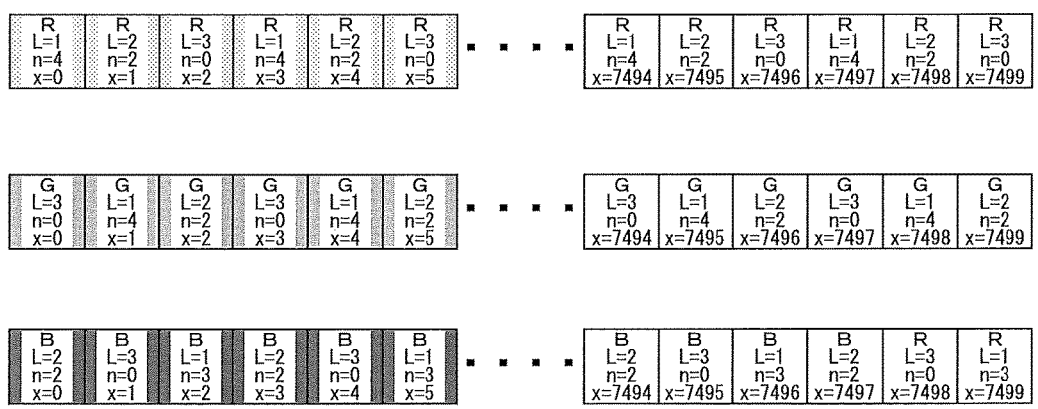

The states of the pieces of image data, which are stored in the line memory 404 and sorted by the data sorting circuit 403 to be read out, are illustrated in FIG. 5A and FIG. 5B. First, the pieces of image data are stored in the line memory 404 in the order of the arrangement of the light receiving elements corresponding to the respective reading lines of the line sensor 203. That is, as illustrated in FIG. 5A, pieces of image data of five reading lines L1, three reading lines L2, and one reading line L3 are stored in the line memory 404. This is because, at a time point at which the image reading of the reading line L3 is ended, reading for three reading lines is already ended in the reading line L2 separated by two pixels, and reading for five reading lines is already ended in the reading line L1 separated by four pixels. At this time point, the respective pieces of image data of R, G, and B are mixed in one reading line and are stored in the line memory 404 under this state.

The reading line L1 and the reading line L2 are arranged so as to be separated by two pixels in the sub-scanning direction, and the reading line L1 and the reading line L3 are arranged so as to be separated by four pixels in the sub-scanning direction. Therefore, the image data of the reading line L2 acquired at a certain timing corresponds to a signal received at a position shifted by two pixels in the sub-scanning direction with respect to the reading line L1. Similarly, the image data of the reading line L3 corresponds to a signal received at a position shifted by four pixels in the sub-scanning direction with respect to the reading line L1. Therefore, when sorting those pieces of image data for each color of R, G, and B, the data sorting circuit 403 shifts the pieces of image data by the number of the shifted pixels to read out and store the shifted pieces of image data. That is, the image data of the reading line L2 is shifted by two pixels in the sub-scanning direction to be read out and stored, and the image data of the reading line L3 is shifted by four pixels in the sub-scanning direction to be read out and stored. With this, the pieces of image data can be sorted in consideration of the arrangement structure of the reading lines L1 to L3. In order to perform such sorting, the data sorting circuit 403 reads out and stores the pieces of image data stored in the line memory 404 in the order illustrated in FIG. 5B. The storing may be performed through overwriting of the line memory 404, or through writing to a different area of the line memory 404.

In FIG. 5B, L represents a reading line number, and L=1 represents the reading line L1. Further, n represents a reading line coordinate of the line memory 404, n=0 represents the latest reading line coordinate input from the A/D conversion circuit 402, and n=1 represents a reading line coordinate one reading line before n=0. The same applies to n=2 and subsequent reading line coordinates. Further, x corresponds to a position (coordinate) of the light receiving element (of one pixel) of the line sensor 203 in the main scanning direction. In the first embodiment, description is made assuming that x ranges from 0 to 7,499.

First, the reading line L1 is focused on. The data sorting circuit 403 reads out "L=1, n=4, x=0". After the read-out is finished, the image data of "L=1, n=3, x=0" is read out and this image data is written to "L=1, n=4, x=0". Similar processing is performed for n=3, 2, and 1. After the image data of "L=1, n=0, x=0" is read out, and the image data is written to "L=1, n=1, x=0", new image data is imported. That is, image data corresponding to the position in the main scanning direction of x=0 of the line sensor 203, which is newly transmitted from the A/D conversion circuit 402, is written to "L=1, n=0, x=0".

Such an operation is called a "first-in first-out (FIFO) operation". The data sorting circuit 403 performs this FIFO operation for x=1, x=2, . . . x=7,499. After the FIFO operation for the reading line L1 is ended, the data sorting circuit 403 performs a similar FIFO operation also for the reading lines L2 and L3. In this manner, the data sorting circuit 403 sequentially forms the row of the image data sorted for each color. The image data row of the red color is called "R reading line", the image data row of the green color is called "G reading line", and the image data row of the blue color is called "B reading line".

The pieces of image data sorted into the R reading line, the G reading line, and the B reading line by the data sorting circuit 403 are input to a shading correction circuit 405. The shading correction circuit 405 is a circuit configured to perform shading correction for correcting the influence of unevenness of the light amount of the light source 201 and the influence of pixel sensitivity of the line sensor 203. The image data subjected to shading correction is input to a dust detection circuit 406.

The dust detection circuit 406 is configured to detect an abnormal pixel that is not present in the original image, that is, dust, based on results of detection of the light receiving elements configured to receive light of the same color in different reading lines. In this example, the dust detection circuit 406 detects dust based on the state of the pixels sorted by the data sorting circuit 403. For example, the dust detection circuit 406 detects dust by comparing digital values of the sorted pieces of image data of any one color or respective colors. Then, the dust detection circuit 406 determines whether or not the detected dust has a predetermined pixel width or less in the main scanning direction, to thereby enable execution of processing based on the result of the determination. In this example, the dust detection circuit 406 generates a predetermined flag, that is, a "dust flag", representing information such as the position and the size of the detected dust, and transmits the dust flag to a dust correction circuit 407 at a subsequent stage. The dust detection circuit 406 further notifies the CPU 401 of the detection of dust with an interruption signal.

The dust correction circuit 407 is a circuit serving as an example of correction means, and is configured to perform dust correction processing based on the dust flag transmitted from the dust detection circuit 406. Details of the dust correction processing are described later. The operation portion 408 is configured to display operation instruction inputs from the user, such as a reading start instruction and designation of the reading original size, and messages from the image reading apparatus side to the user.

Figure 6:
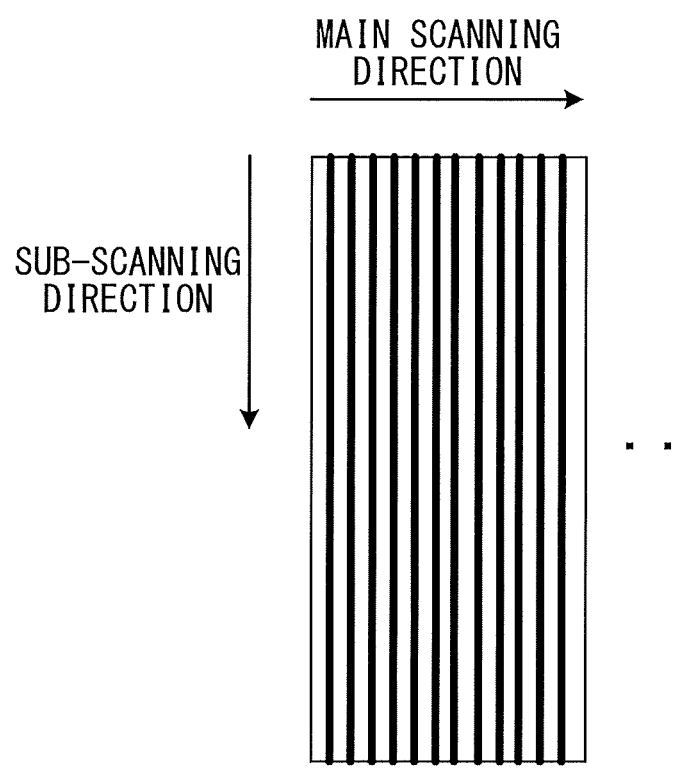
FIG. 6 is an explanatory diagram of a parallel-line original.

Now, the reason why the resolution of the optical system (lens 202 and mirrors 204, 205, 206, and 207) of the original reading unit 106 is set to be lower than the resolution of the line sensor 203 is described in detail. For example, it is assumed that the original reading unit 106 reads, using the line sensor 203, an original having white and black lines (called "parallel lines") repeated for each pixel in the main scanning direction illustrated in FIG. 6 (called "parallel-line original"). The main scanning direction is a direction horizontal to each reading line of the line sensor 203, and the direction in which the parallel-line original is conveyed is the sub-scanning direction. The above-mentioned optical system of the original reading unit 106 has a modulation transfer function (MTF) characteristic as shown in FIG. 7C. MTF is one index for evaluating lens performance. How faithfully the contrast of the object (in this case, the original) can be reproduced is expressed by MTF as a spatial frequency characteristic in order to find out the imaging performance of the optical system. In FIG. 7C, the lateral axis represents a resolution, and the vertical axis represents a ratio (0 to 1.0). In general, MTF represents different characteristics in the main scanning direction and the sub-scanning direction due to the lens and the optical system, but for the sake of convenience of description, it is here assumed that the same MTF characteristic is obtained in the main scanning direction and the sub-scanning direction.

Figure 7A:
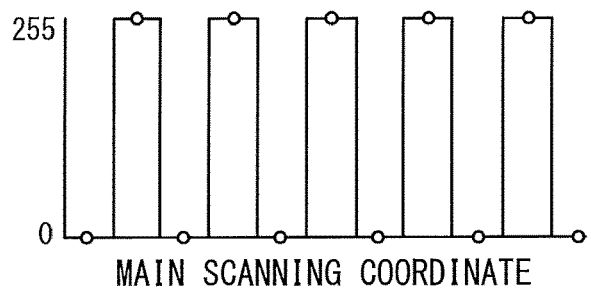
FIG. 7A, FIG. 7B, FIG. 7C, FIG. 7D, and FIG. 7E are graphs for showing relationships between MTF characteristics and results of reading the parallel-line original.
Figure 7B:
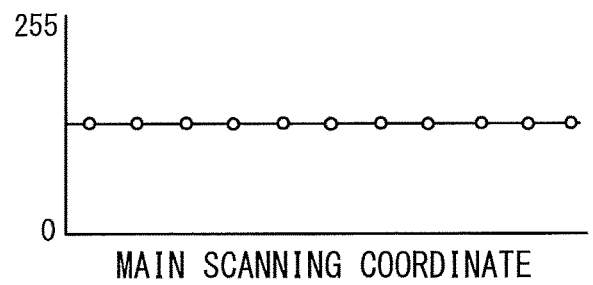
Figure 7C:
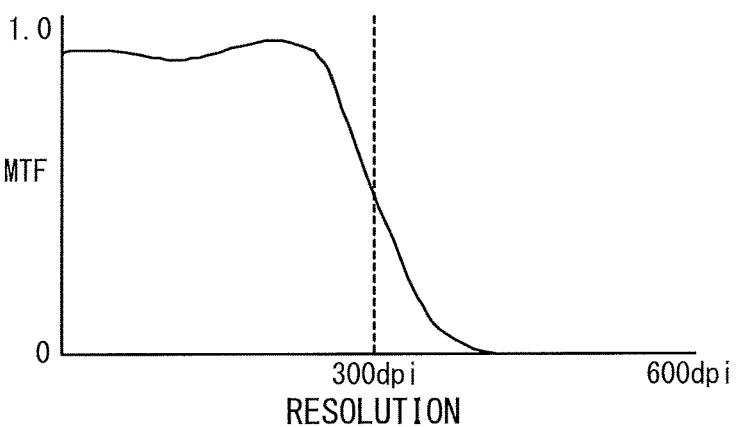

The reading characteristics obtained when the parallel-line original having a parallel-line period of 600 dpi is read by the line sensor 203 are shown in FIG. 7A and FIG. 7B. FIG. 7A represents a reading characteristic obtained when the MTF is 1.0, which is an ideal value, in all resolutions, and FIG. 7B represents an actual MTF reading characteristic. In FIG. 7A and FIG. 7B, the lateral axis represents a coordinate in the main scanning direction, and the vertical axis represents an A/D-converted reading level (digital value: 0 to 255) of the line sensor 203. The reading level represents a whiter color as being closer to 255, and represents a blacker color as being closer to 0. When the MTF is 1.0, which is an ideal value, in all resolutions, the parallel-line original is faithfully read as shown in FIG. 7A, but the original reading unit 106 having the MTF characteristic as shown in FIG. 7C does not have resolving power at 600 dpi. Therefore, the reading level obtained when the parallel-line original is actually read is as shown in FIG. 7B. That is, the white and black parallel lines are read as mixed gray due to so-called blurring.

Figure 7D:
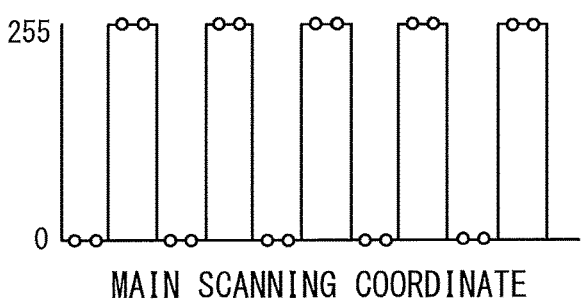
Figure 7E:
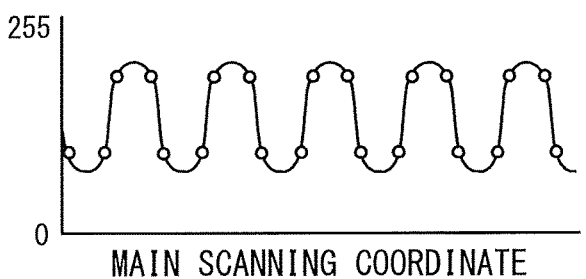

In contrast, when the period of the parallel lines is 300 dpi, the reading characteristic is as shown in FIG. 7D in an ideal MTF, but referring to FIG. 7C, the MTF is about 0.5, and hence a reading characteristic as shown in FIG. 7E is actually obtained. Also in this case, the reading level of the parallel lines is close to gray due to the blurring, and the result of the reading level of one pixel is affected by several adjacent pixels.

In the first embodiment, the dust detection circuit 406 detects dust by using such a reading characteristic that the reading level of one pixel also affects the adjacent pixels.

Figure 8A:
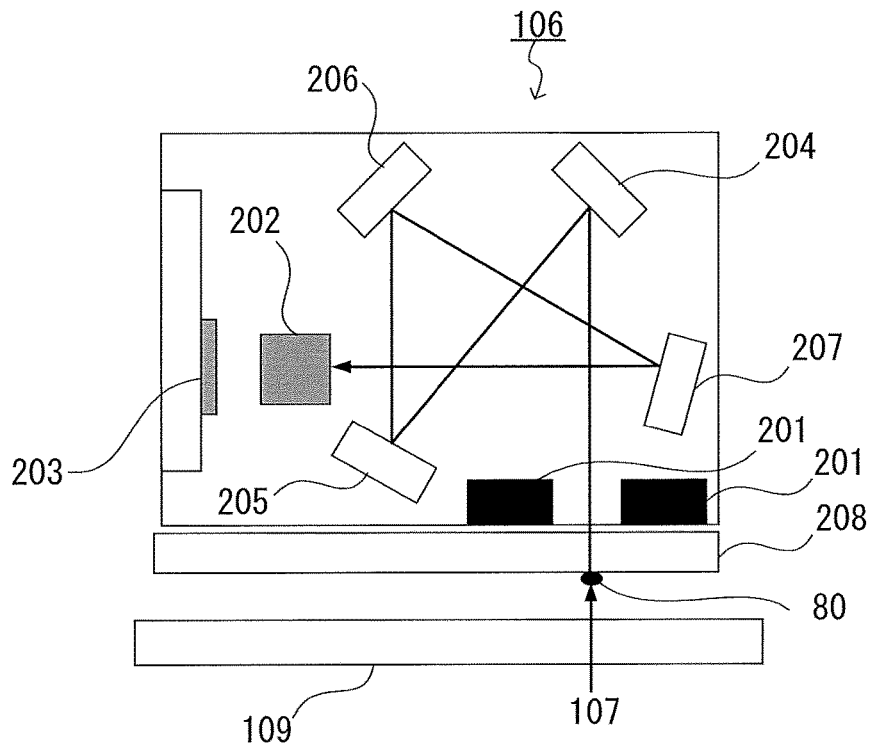
FIG. 8A and FIG. 8B are explanatory diagrams for illustrating a dust adhering state.
Figure 8B:
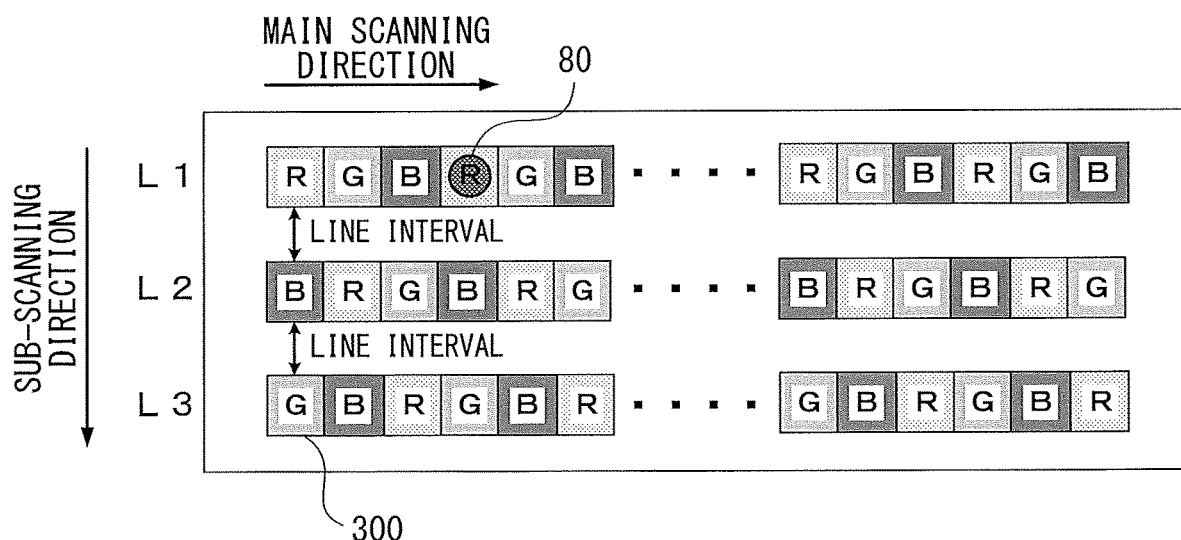

Next, the dust detection circuit 406 is described in detail. FIG. 8A is an illustration of a state in which dust adheres to the original reading unit 106. That is, dust 80 adheres at the reading position of an original table glass 208. FIG. 8B is an illustration representing a position of the line sensor 203 to which the position of the dust 80 corresponds. In the example illustrated in FIG. 8B, the dust 80 is present at a position of the R pixel in the second period of the reading line L1. The reading results of the respective reading lines L1, L2, and L3 of the line sensor 203 at this time are shown in FIG. 9A. The dust 80 adheres at the position of the R pixel in the second period of the reading line L1, but due to the reading characteristic of the original reading unit 106 described above, the B pixel and the G pixel adjacent thereto are affected, and thus reading levels thereof are reduced. This state continues while the dust 80 adheres at this position. FIG. 9B is an example of image data obtained by sorting the reading results of FIG. 9A into the R reading line, the G reading line, and the B reading line by the data sorting circuit 403. As shown in FIG. 9B, not only the R reading line but also the G reading line and the B reading line are reduced in level by one pixel. Therefore, the presence of dust with the size of one pixel can be detected in any reading line.

Figure 10A:
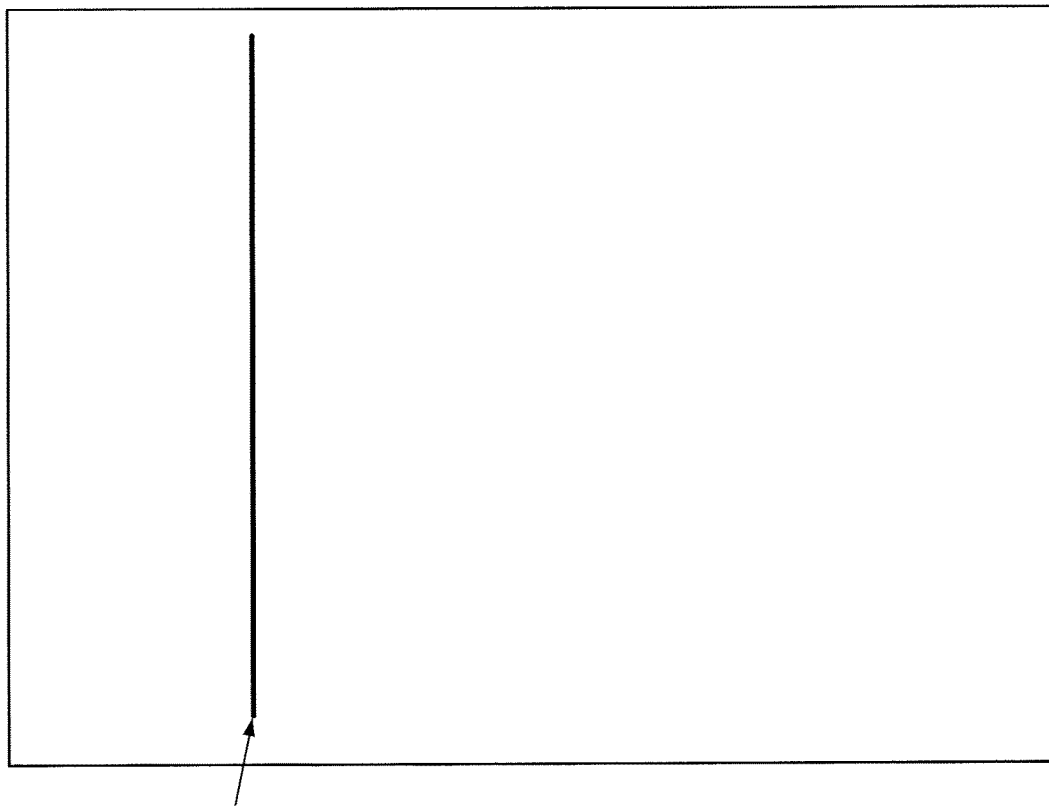
FIG. 10A and FIG. 10B are explanatory diagrams for illustrating a state of reading a line present in the original.
Figure 10B:
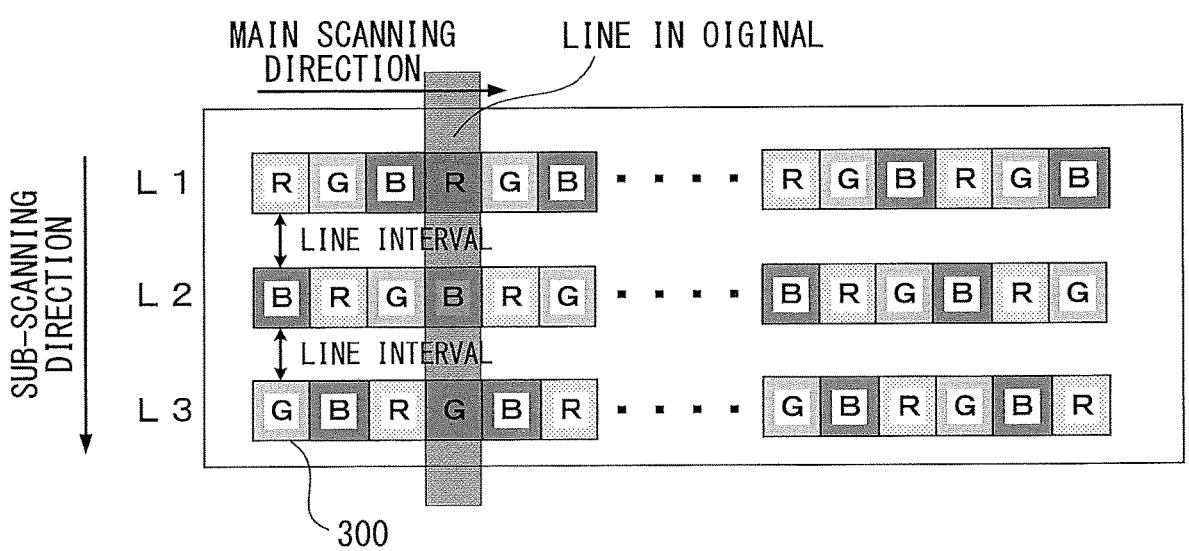

Next, results of reading a line present in the original, which is not dust, are described. For example, it is assumed that a line having a one-pixel width is present in the original as illustrated in FIG. 10A, and this line is read at a corresponding position of the line sensor 203 illustrated in FIG. 10B. The reading results of the reading lines L1, L2, and L3 of the line sensor 203 at this time are shown in FIG. 11A. The line in the original is read by the line sensor 203 in the order of the reading line L1, the reading line L2, and the reading line L3. FIG. 11B is a graph for showing a state in which the reading results read as shown in FIG. 11A are sorted into each color by the data sorting circuit 403. As shown in FIG. 11A and FIG. 11B, in the case of the line present in the original, the reading level is reduced in every reading line even after the sorting. That is, the reading level is reduced by three pixels.

This example is described assuming a line in which R, G, and B have the same reading level, but the reading level may differ depending on the color. For example, when the line present in the original has a cyan color, the reading results of the reading lines L1, L2, and L3 of the line sensor 203 when this line is read are as shown in FIG. 12A. The level is reduced by one pixel in each reading line before the sorting is performed by the data sorting circuit 403. This is because, although the line present in the original is one pixel, as described above, the influence of this pixel appears also in pixels adjacent thereto due to the reading characteristic of the original reading unit 106. That is, the R pixel whose level is reduced in the reading line L2 is adjacent to the line read in the reading line L1, and hence blurring is caused due to the reading characteristic of the original reading unit 106, which appears as level reduction. The same applies to the level reduction of the R pixel in the reading line L3.

A state in which sorting is performed by the data sorting circuit 403 when this cyan line is read is shown in FIG. 12B. In FIG. 12B, in order from the top, the R reading line, the G reading line, and the B reading line are shown. As shown in FIG. 12B, after the sorting, the level is reduced only in the R reading line. That is, in the case of a cyan line, the line is read without level reduction in the G pixel and the B pixel, but the center of the line is read in the case of the R pixel of the reading line L1, and hence the R pixel is increased in level reduction. When the results are sorted into the R reading line, the G reading line, and the B reading line by the data sorting circuit 403, only the R reading line can be confirmed as a line whose level is reduced across three pixels due to the characteristic of the original reading unit 106.

As described above, even when the line in the original has a one-pixel width, the line is treated as having a three-pixel width due to the reading characteristic of the original reading unit 106 after sorting is performed by the data sorting circuit 403. In contrast, dust adhering on the original table glass has a one-pixel width in every reading line as shown in FIG. 9A and FIG. 9B after the pixels are sorted by the data sorting circuit 403. The dust detection circuit 406 utilizes such a characteristic to detect dust that is not present in the image of the original being an object, based on the state of the pixels having the same color detected by the line sensor 203.

Figure 13:
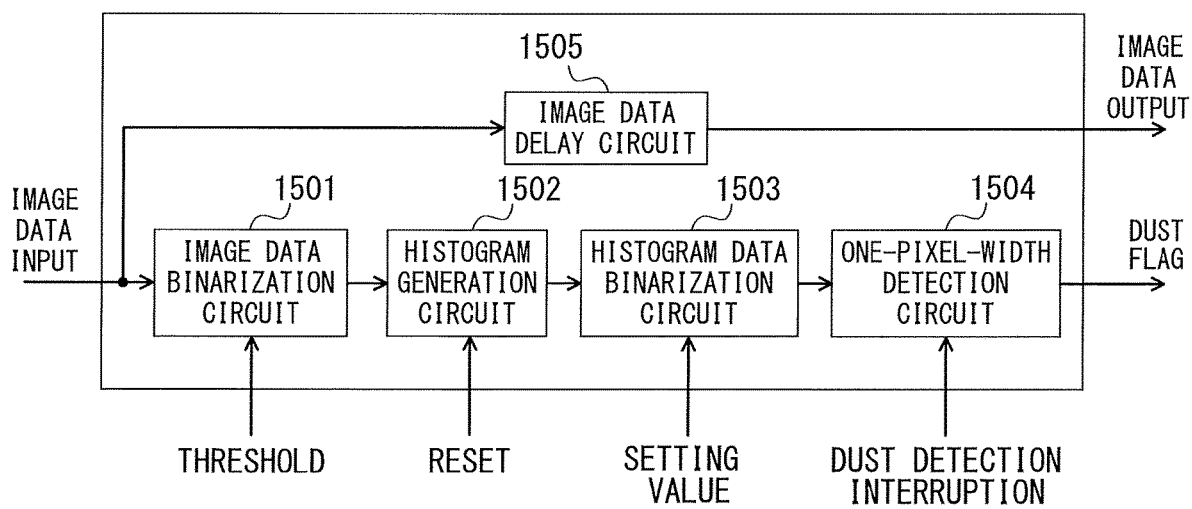
FIG. 13 is a detailed block diagram of a dust detection circuit.

FIG. 13 is an internal block diagram of the dust detection circuit 406 configured to perform the above-mentioned dust detection. The dust detection circuit 406 includes an image data binarization circuit 1501, a histogram generation circuit 1502, a histogram data binarization circuit 1503, a one-pixel-width detection circuit 1504, and an image data delay circuit 1505. The image data binarization circuit 1501 is configured to compare the image data input from the shading correction circuit 405 with a predetermined threshold set by the CPU 401, to thereby binarize the image data having the threshold or less as "1" and other data as "0". The data subjected to binarization is called "binarized data". The histogram generation circuit 1502 is configured to generate histogram data representing the distribution of the binarized data output from the image data binarization circuit 1501. The histogram data is a distribution of sorted pixels. In the first embodiment, the histogram data is an accumulative addition value obtained through addition for each reading line during reading of the original. This histogram data can be reset to "0" at any time by the CPU 401.

The histogram data binarization circuit 1503 is configured to set a pixel position at which the accumulative addition value obtained by the histogram generation circuit 1502 exceeds a setting value obtained from the CPU 401 to "1", and a pixel position at which the accumulative addition value does not exceed the setting value to "0", to thereby output the results as dust candidate flags. Only when a dust candidate flag representing a one-pixel width is present among the dust candidate flags output from the histogram data binarization circuit does the one-pixel-width detection circuit 1504 output the dust candidate flag as a dust flag to a subsequent-stage circuit. The image data delay circuit 1505 is configured to delay the image data by the same width as the pixel width represented by the dust flag, to thereby output the delayed image data to a subsequent-stage circuit together with information on the relative position with respect to the dust flag. Although not shown, three image data delay circuits 1505 are prepared for the image data of the R reading line, the G reading line, and the B reading line input from the shading correction circuit 405.

Figure 14A:
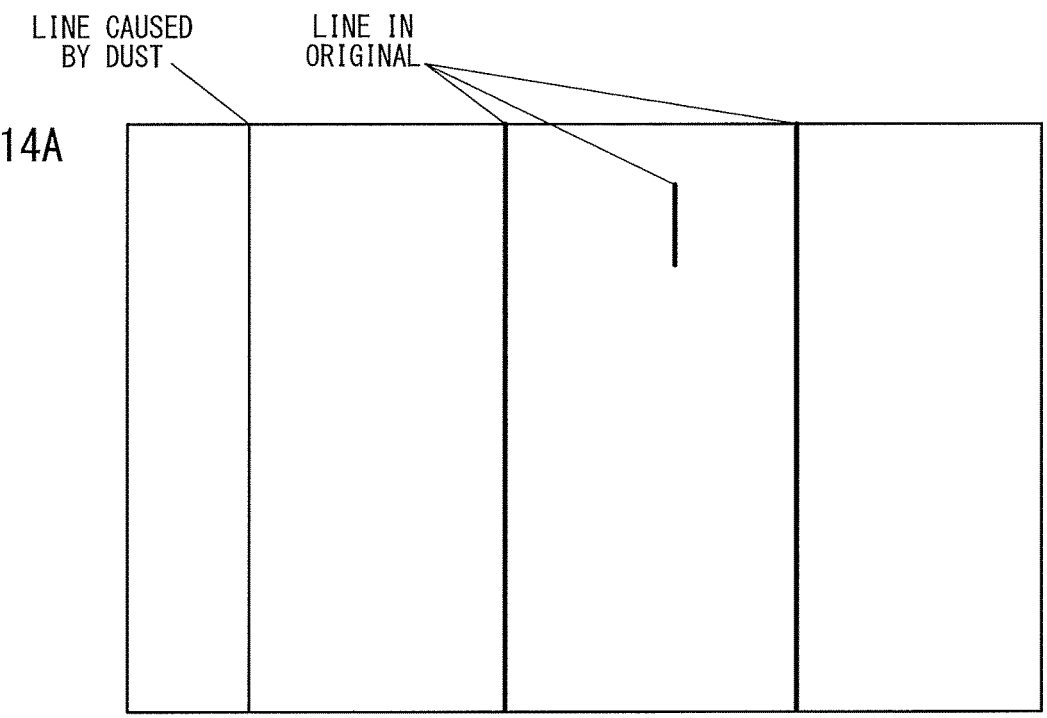
FIG. 14A, FIG. 14B, FIG. 14C, and FIG. 14D are diagrams for showing results of reading a line in the original and a line caused by dust.
Figure 14B:
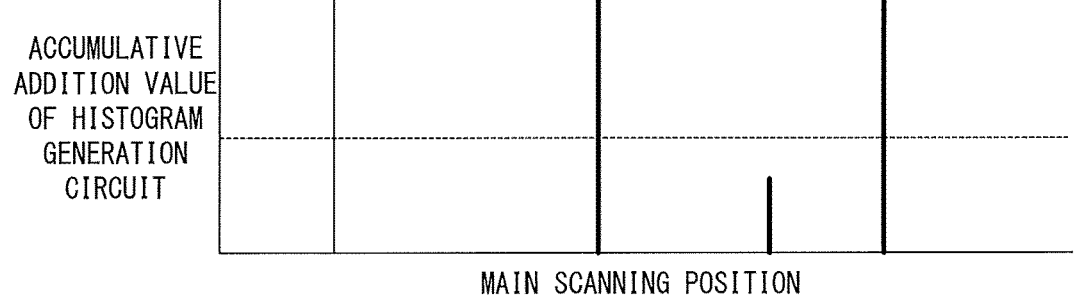
Figure 14C:
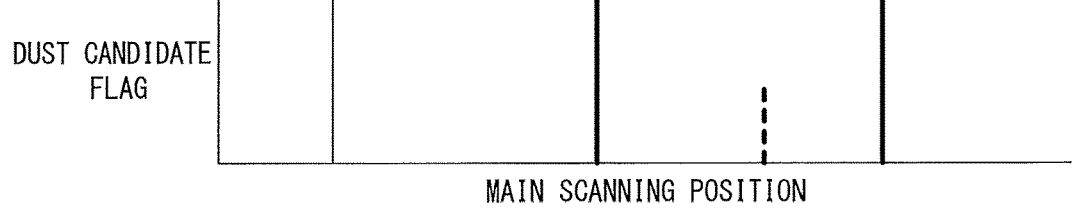
Figure 14D:
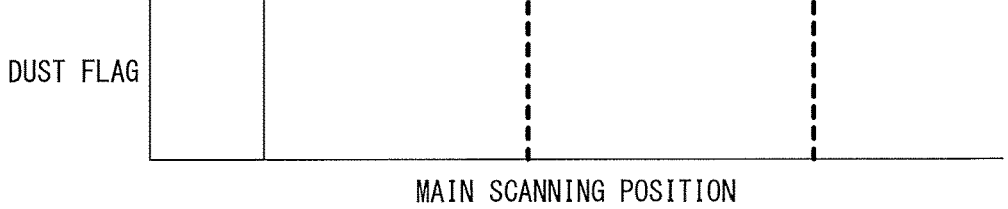

The example of the processing performed by the dust detection circuit 406 at this time is specifically described. For example, it is assumed that the result of reading the original is an image as illustrated in FIG. 14A in which a line caused by dust (black streak) and a line present in the original extend in the same direction. As described above, the line caused by dust has a one-pixel width, and the line present in the original has a three-pixel width. The relationship between the accumulative addition value of the histogram generation circuit 1502 and the threshold (dotted line) set by the CPU 401 in this case is shown in FIG. 14B. The histogram data binarization circuit 1503 outputs dust candidate flags in which the pixel position in the main scanning direction (main scanning position) that exceeds the threshold is set as "1" and other pixel positions are set as "0" to the one-pixel-width detection circuit 1504 together with the information on the position of each line. As a result, as shown in FIG. 14C, first, the short line present in the original is eliminated from the dust candidate flags. Further, when the one-pixel-width detection circuit 1504 detects a dust candidate flag representing a one-pixel width from the dust candidate flags, the one-pixel-width detection circuit 1504 outputs its position as "1" to the subsequent-stage circuit, whereas when the one-pixel-width detection circuit 1504 detects a dust candidate flag representing other pixel widths, the one-pixel-width detection circuit 1504 outputs its positions as "0" to the subsequent-stage circuit. As a result, as shown in FIG. 14D, the long line present in the original is also eliminated from the dust candidate flags. That is, parts other than the part having a one-pixel width are all eliminated from the dust candidate flags, and hence the line caused by dust (black streak) can be reliably confirmed regardless of the length of the line present in the original. The dust detection circuit 406 detects the dust present on the original table glass in this manner.

Further, at a time point at which the one-pixel-width detection circuit 1504 detects any one dust flag representing the one-pixel width, the one-pixel-width detection circuit 1504 notifies the CPU 401 of this fact with an interruption signal. The accumulative addition value stored in the histogram generation circuit 1502 is reset for each original by the CPU 401. That is, dust detection is possible for each original.

The dust correction circuit 407 determines the pixel at the position represented by the dust flag output from the dust detection circuit 406 as the pixel caused by dust, and uses a pixel adjacent to the pixel in the same color to correct the pixel to have that color. For example, the pixel is corrected to have the color through linear interpolation of pixels adjacent on the right and left. Examples of the reading level of the image data input to the dust correction circuit 407, the state of the dust flag, and the reading level of the image data after the correction are shown in FIG. 15. FIG. 15 is an example of the R reading line. The dust correction circuit 407 performs linear interpolation based on the pixels adjacent on the right and left to the pixel specified by the dust flag, and generates image data Ra whose reading level is recovered. The right adjacent pixel and the left adjacent pixel are both the R pixel, and hence it is easy to recover the reading level. Further, the abnormal pixel having a one-pixel width is subjected to linear interpolation using pixels having the same color, and hence a trace of correction is less liable to remain.

The dust correction circuit 407 automatically performs the above-mentioned correction processing each time the dust flag is input from the dust detection circuit 406, to thereby output the image data subjected to the correction to the subsequent-stage circuit.

Figure 16:
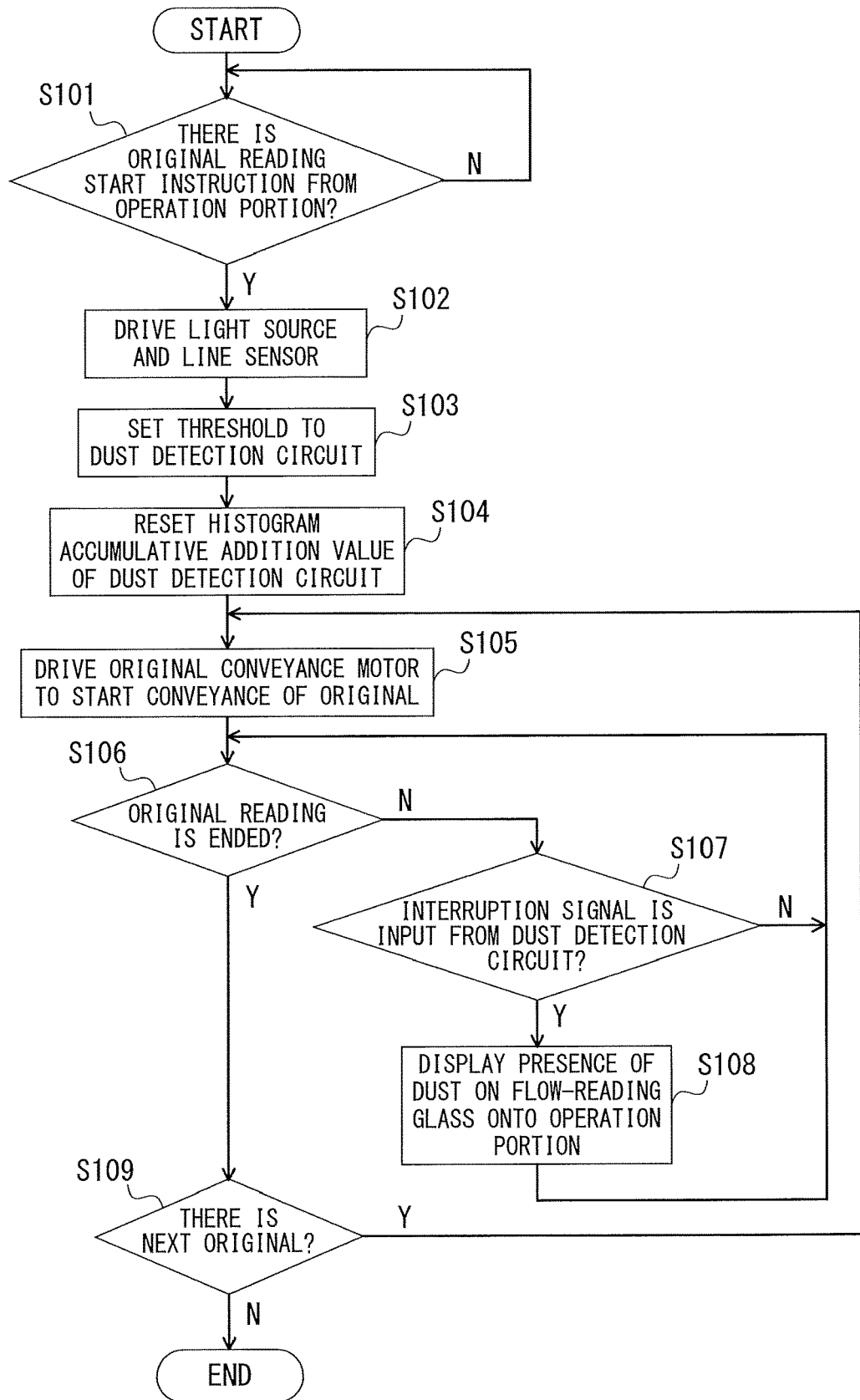
FIG. 16 is an explanatory procedure diagram of original reading processing.

The procedure of the processing performed by the CPU 401 when the original is read in the image reading apparatus according to the first embodiment is described with reference to FIG. 16. The CPU 401 monitors the operation portion 408, and waits until a reading start instruction is input from the user (Step S101: N). When the reading start instruction is input (Step S101: Y), the CPU 401 drives the light source 201 and the line sensor 203 for preparation before the reading (Step S102). Further, the CPU 401 sets the threshold for binarization with respect to the dust detection circuit 406 (Step S103). Further, the CPU 401 resets the accumulative addition value of the histogram generation circuit 1502 of the dust detection circuit 406 (Step S104). Next, the CPU 401 drives the original conveyance motor 105 to start the conveyance of the original (Step S105). When the original reading unit 106 has not finished reading one original (Step S106: N), the CPU 401 monitors whether or not an interruption signal is input from the dust detection circuit 406 (Step S107). When no interruption signal is input (Step S107: N), the CPU 401 returns the processing to Step S106. When the interruption signal is input (Step S107: Y), the CPU 401 displays a warning message representing that dust is present on the original table glass on the operation portion 408, to thereby urge the user to clean the original table glass (Step S108). After that, the CPU 401 returns the processing to Step S106. When the original reading unit 106 finishes reading one original (Step S106: Y), and the next original is present, the CPU 401 resets the histogram accumulative addition value of the dust detection circuit 406, and returns the processing to Step S105, to thereby start reading of the next original. When there is no next original (Step S109: N), the CPU 401 ends the original reading operation (Step S109). The warning message displayed on the operation portion 408 can be deleted through a press of a confirmation button displayed on the operation portion 408. The user removes the dust adhering to the original table glass, and then presses the confirmation button displayed on the operation portion 408.

As described above, according to the first embodiment, the influence of dust can be set to a one-pixel width, which is a characteristic that cannot be obtained from the image present in the original. Therefore, the line caused by the dust (black streak) can be accurately detected without falsely detecting the line present in the original as dust. With this, it is possible to display a message for urging the user to clean the original table glass, or perform control such as image correction based on accurate information. Further, a plurality of reading means are not required to be provided unlike for the related-art similar apparatus, and hence the apparatus also has an advantage in terms of cost.

In the first embodiment, the image data of the original is read as an aggregate of a plurality of pixels in which adjacent pixels have different colors in each of the main scanning direction and the sub-scanning direction, and the image data is stored in the line memory 404 in association with the relationship of the relative position of each pixel. After that, the data sorting circuit 403 sorts pieces of image data of the original so that pixels having the same color are adjacent to each other and rows of same-color pixels are obtained. However, such sorting into the same color by the data sorting circuit 403 is not necessarily required. The image data stored in the line memory 404 may be subjected to processing such as dust detection or dust correction by the CPU 401 without performing sorting into the image data having the same color.

Second Embodiment

In the first embodiment, description is made of an example in which the influence of dust is set to a one-pixel width to perform dust detection. However, the size and shape of the dust are uneven in many cases, and it is predicted that the dust cannot be accurately detected depending on the position at which the dust adheres. Further, due to the lens or the like, the dust may be imaged so as to be larger than the actual dust. In view of those situations, in a second embodiment of the present invention, an example of an embodiment for detecting and correcting the dust more accurately is described.

Figure 17:
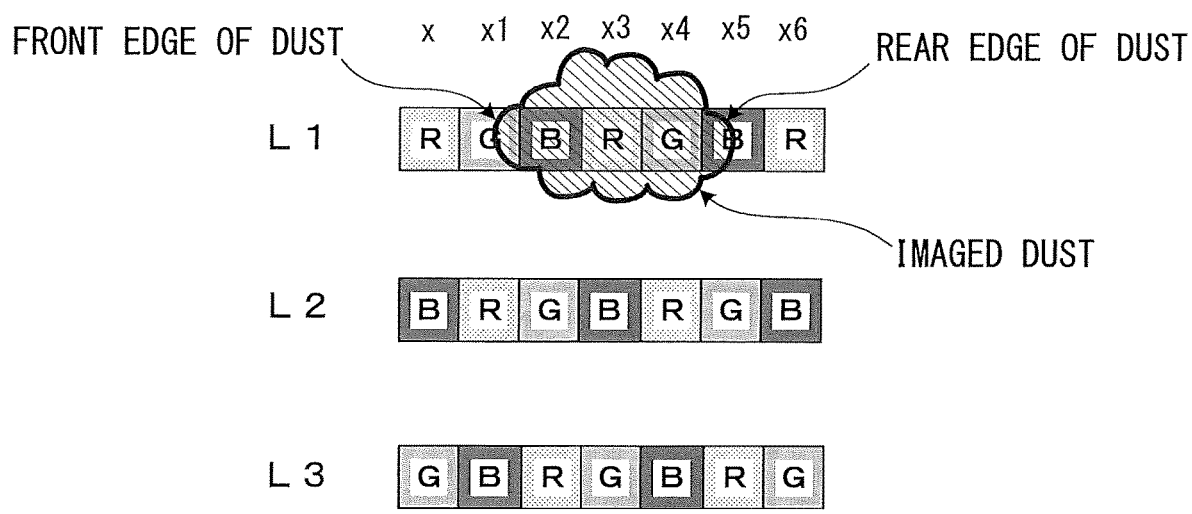
FIG. 17 is an explanatory diagram of an imaging state of widely imaged dust.

FIG. 17 is an illustration of a state of dust that is imaged to have a larger size on the line sensor 203 due to the optical components or the like in the image reading apparatus. In FIG. 17, x corresponds to the individual positions of the light receiving elements in the line sensor 203 similarly to FIG. 5A and FIG. 5B. That is, FIG. 17 is an illustration of a state in which dust is imaged at positions of x2 (B), x3 (R), and x4 (G) in the reading line L1 of the line sensor 203. Position x is 0 (reference position), and position x1 is a position (x+1) shifted by a one-pixel width from x in the main scanning direction. Position x2 is a position (x+2) shifted by a two-pixel width from x in the main scanning direction. The same applies to position x3 and position x4. Suffix (B) means the B pixel, suffix (R) means the R pixel, and suffix (G) means the G pixel.

When dust is imaged to have a shape as illustrated in FIG. 17, the dust detection circuit 406 of the first embodiment detects dust at positions x2 (B), x3 (R), and x4 (G) in the reading line L1. In actuality, edges of the dust may be imaged also at positions of x1 (G) and x5 (B) in the reading line L1. In FIG. 17, an imaged part at x1 (G) in the reading line L1 is referred to as a front edge of the dust, and an imaged part at x5 (B) is referred to as a rear edge of the dust. In this case, the pixel at x1 (G) in the reading line L1, at which the front edge of the dust is imaged, is less affected by the dust, and the difference in reading level from the surrounding G pixel does not apparently appear. Therefore, in the dust detection circuit 406 of the first embodiment, this dust may not be accurately detected. The same applies to x5 (B) in the reading line L1, at which the rear edge of the dust is imaged. However, dust tends to continuously adhere at the same position, and in this case, conspicuous dust appears in an original image as a continuous streak in the sub-scanning direction. In view of this, in the second embodiment, when the distribution of the binarized data satisfies a predetermined condition, for example, when pixels adjacent in the main scanning direction have no dust, the detected dust (abnormal pixel) is expanded to the adjacent pixels in the same reading line. In the example given above, the dust flag is expanded also to the pixels at x1 (G) and x5 (B).

Figure 18:
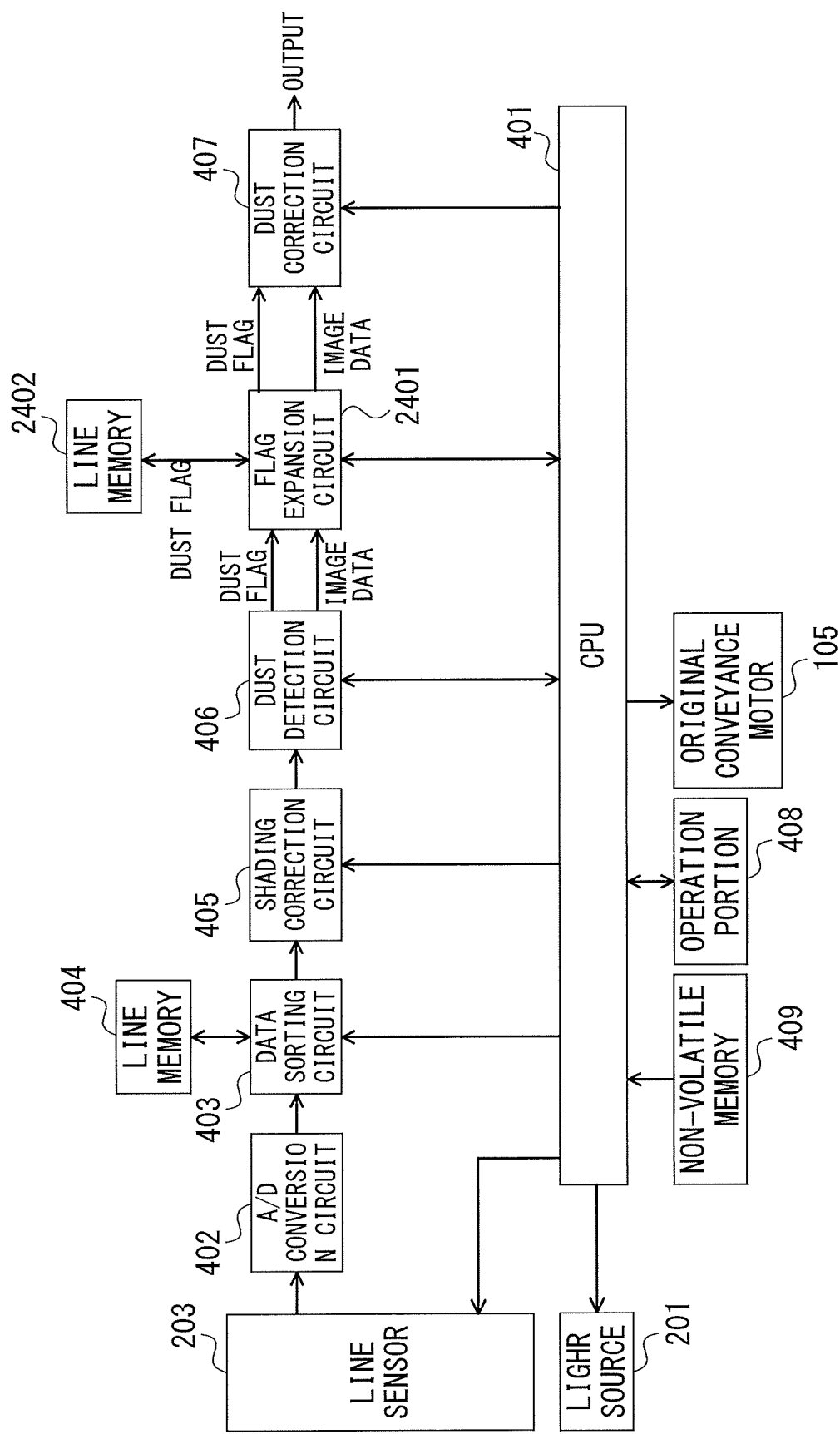
FIG. 18 is a block diagram of a control system of an image reading apparatus according to a second embodiment of the present invention.

The configuration of the image reading apparatus illustrated in FIG. 1, the configuration of the original reading unit 106 illustrated in FIG. 2, and the configuration of the line sensor 203 illustrated in FIG. 3 are similar to those of the first embodiment, and hence description thereof is omitted herein. FIG. 18 is a block diagram of the control system of the image reading apparatus according to the second embodiment. Components described in the first embodiment are denoted by like reference symbols. The second embodiment differs from the first embodiment in that a flag expansion circuit 2401 and a line memory 2402 are added to the dust detection circuit 406 as dust detection means.

Figure 19A:
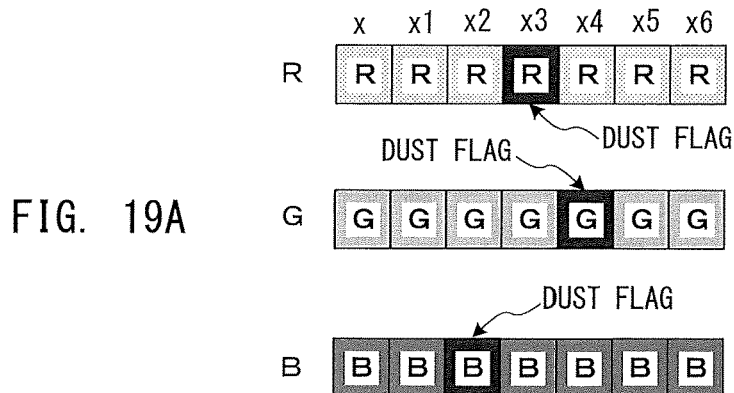
FIG. 19A, FIG. 19B, FIG. 19C, and FIG. 19D are explanatory diagrams for illustrating operations of a flag expansion circuit and a line memory.
Figure 19B:
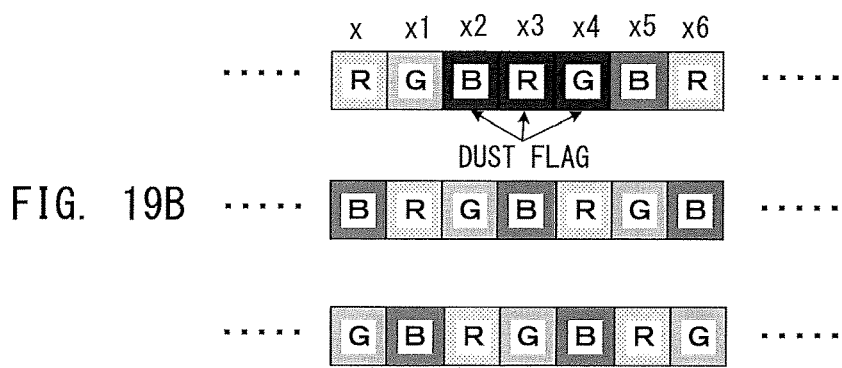
Figure 19C:
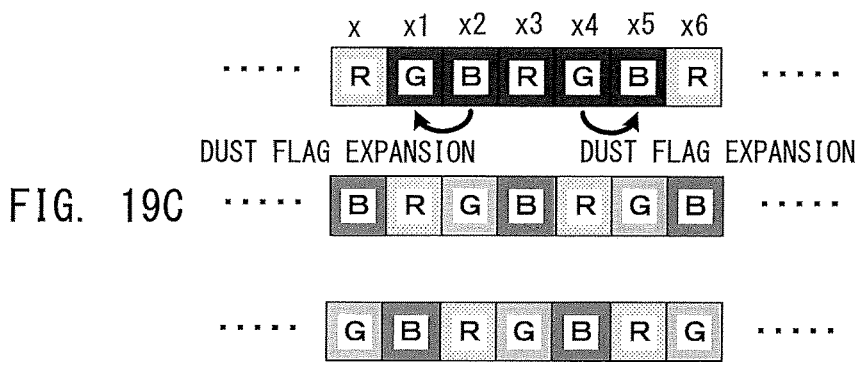
Figure 19D:
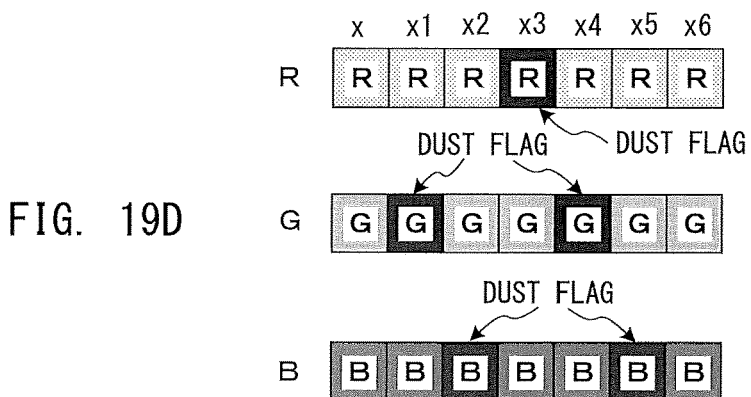

The operations of the flag expansion circuit 2401 and the line memory 2402 are described with reference to FIG. 19A to FIG. 19D. As illustrated in FIG. 19A, dust flags sorted into respective colors of R, G, and B are input from the dust detection circuit 406 to the flag expansion circuit 2401. In the example of FIG. 19A, the dust flags are allocated at positions of x2 (B), x3 (R), and x4 (G). The flag expansion circuit 2401 stores those dust flags in the line memory 2402 so that the dust flags are in the same arrangement as the line sensor 203. That is, as illustrated in FIG. 19B, the flag expansion circuit 2401 stores the dust flags in the line memory 2402 as x2 (B), x3 (R), and x4 (G). With this, it is returned to a state in which the dust is imaged on the line sensor 203. Next, as illustrated in FIG. 19C, the flag expansion circuit 2401 expands the dust flags stored in the line memory 2402 to pixels adjacent on the right and left to the dust flags. That is, the flag expansion circuit 2401 also allocates the dust flags to the pixels at x1 (G) and x5 (B). With this, the edges of the dust, which have been undetectable by the dust detection circuit 406, can be subjected to the correction processing. After that, the flag expansion circuit 2401 sorts the dust flags stored in the line memory 2402 illustrated in FIG. 19C into respective colors of R, G, and B as illustrated in FIG. 19D, and reads out the dust flags, to thereby transmit the dust flags to the dust correction circuit 407. The dust correction operation thereafter is similar to that of the first embodiment, and hence description thereof is omitted herein.

With the above-mentioned processing, correction can be performed also on the pixels at which the edges of the dust are imaged, which are difficult to be detected by the dust detection circuit 406 of the first embodiment. Further, as illustrated in FIG. 19D, the dust flags expanded in the second embodiment are independent dust flags each having a one-pixel width after being sorted into the respective colors of R, G, and B. Therefore, there is an advantage in that a trace of correction is less liable to remain even when the dust flags are expanded.

In the second embodiment, description is made of an example in which the dust flags are expanded to the pixels adjacent to the dust flags on the right and left, that is, in the main scanning direction, but the dust flags may be expanded to the pixels adjacent in the sub-scanning direction or an oblique direction.

Third Embodiment

In the first embodiment, description is made of a method involving arranging color filters 300 of R, G, and B on the line sensor 203 in a staggered manner so that the influence of the dust can be divided into one pixel in each color. That is, only the image at the position at which a dust flag representing a one-pixel width is present among the dust candidate flags output from the histogram data binarization circuit 1503 is set as a pixel to be corrected. However, the dust size varies, and hence it is considered that the dust may not always be dividable to have a one-pixel width. This problem is described below.

FIG. 20A is an example of dust that can be divided into one pixel after the sorting into the respective colors of R, G, and B. Further, FIG. 20B is an example of dust divided to have a two-pixel width after the sorting into the respective colors of R, G, and B. In FIG. 20A and FIG. 20B, similarly to FIG. 5A and FIG. 5B, x represents a position of a light receiving element in the line sensor 203. In the example of FIG. 20A, the dust is imaged at the positions of x2 (B), x3 (R), and x4 (G) in the reading line L1. In this case, after the sorting into the respective colors is performed in the procedure illustrated in FIG. 5A and FIG. 5B, the dust can be divided to have a one-pixel width in each color of R, G, and B. Meanwhile, in the example of FIG. 20B, the dust is imaged at positions of x2 (B), x3 (R), and x4 (G) in the reading line L1 and positions of x2 (G), x3 (B), and x4 (R) in the reading line L2. Therefore, after the sorting into the respective colors is performed in the procedure illustrated in FIG. 5A and FIG. 5B, the dust is divided to have one two-pixel width in the R reading line, two one-pixel widths in the G reading line, and one two-pixel width in the B reading line. That is, when the dust adheres across a plurality of reading lines of the line sensor 203 as described above, the imaged dust has a two-pixel width or more even after the sorting into the same color is performed.

Figure 21:
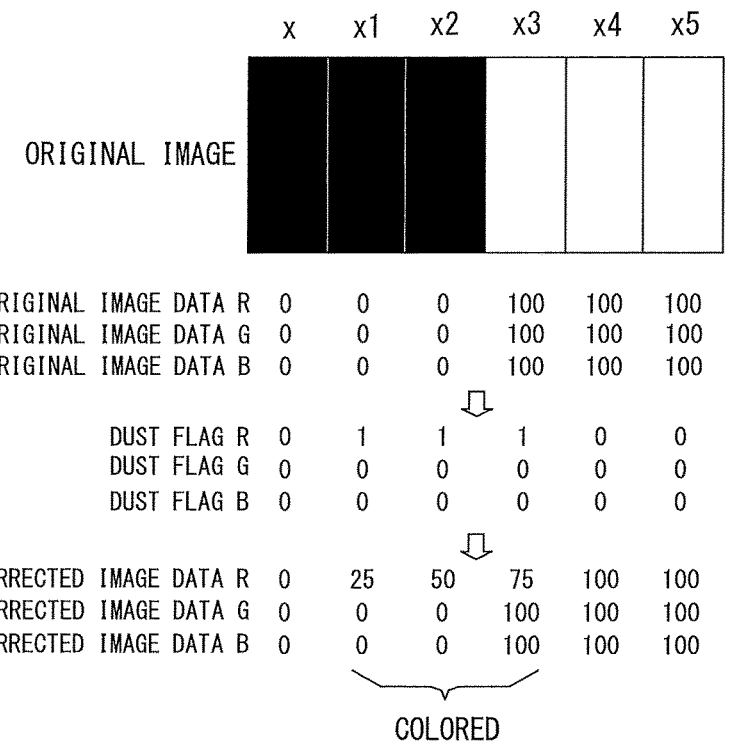
FIG. 21 is an explanatory diagram for illustrating processing of subjecting an edge part of a vertical line to linear interpolation for each color.

Further, in the first embodiment, description is made of an example in which correction is performed through linear interpolation with respect to the dust image having a one-pixel width based on pixels adjacent thereto for each color. However, in the case where the correction is performed through linear interpolation for each color, when there is relatively thick dust at an edge part or the like of the vertical line of the original, an unnecessary color may appear instead through correction. For example, as illustrated in FIG. 21, it is assumed that an edge part of a black (achromatic) vertical line is subjected to linear interpolation for each color. The original image has a black vertical line at positions x to x2 in the main scanning direction, and has a white vertical line at x3 to x5. The digital value after the A/D conversion of the original image is "0" in all pixels of the respective colors of R, G, and B at the positions of x to x2 (black vertical line) and is "100" in all pixels of the respective colors of R, G, and B at the positions of x3 to x5 (white part). As those numerical values are higher, a brighter state is represented. In this case, when dust is present at positions of the R pixels of x1, x2, and x3, linear interpolation is performed using the pixels at the positions of x and x4. Then, the corrected digital value of the R pixel becomes 25 at the position of x1, 50 at the position of x2, and 75 at the position of x3, which are numerical values different from those of the G pixel and the B pixel at the same position. Then, although the original image is achromatic, the original image becomes chromatic in the width of three pixels at x1 to x3 after the correction, and thus unnecessary coloring is caused. In FIG. 21, an example is given of a black achromatic vertical line, but, for example, even when an edge part of a colored line is corrected, unnecessary coloring different from that of the original image is caused.

Figure 22:
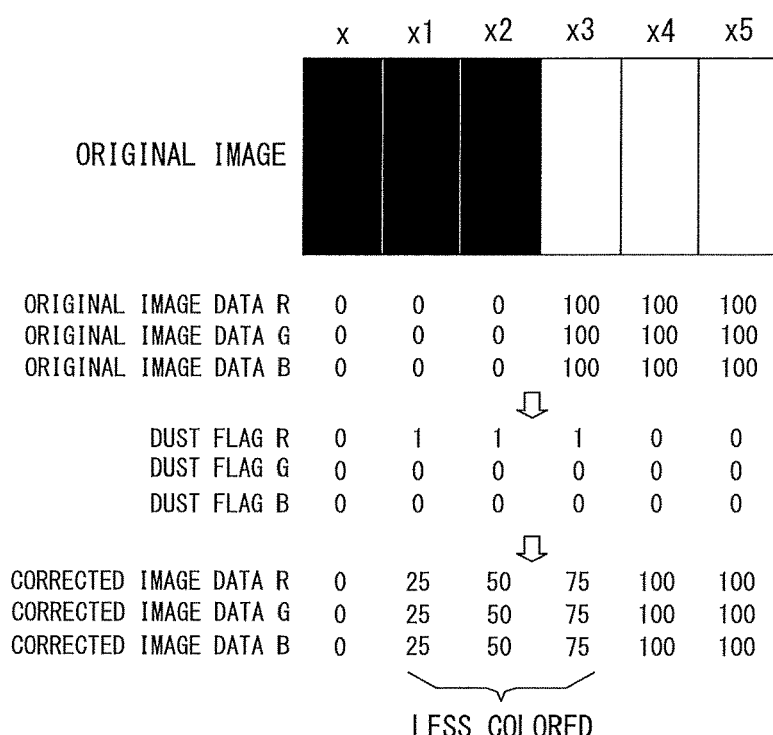
FIG. 22 is an explanatory diagram for illustrating processing of subjecting the edge part of the vertical line to linear interpolation for all colors at the same time.

In order to reduce this unnecessary coloring, when dust is present in any one of the colors of R, G, and B, it is conceivable to similarly perform correction through linear interpolation also for other colors at the same position in the main scanning direction. For example, FIG. 22 is an example of a case where the edge part of the black (achromatic) vertical line is subjected to linear interpolation for all colors at the same time. The original image and the dust position are the same as those of FIG. 21. In FIG. 22, when the dust is present at the R pixels at positions of x1, x2, and x3, the G pixels and the B pixels at the same positions (x1, x2, and x3) in the main scanning direction are also pixels to be corrected. In this manner linear interpolation is performed based on the positions of x and x4 for all of the colors of R, G, and B. With this, the difference in numerical values of R, G, and B at positions of x1, x2, and x3 after the interpolation is equal to that before the correction, and hence unnecessary coloring is less liable to be caused. However, when correction is performed similarly through linear interpolation also for other colors at the same position as illustrated in FIG. 22, the dust divided into one pixel of respective colors of R, G, and B through use of the staggered color filters 300 is corrected based on the original dust width.

Figure 23:
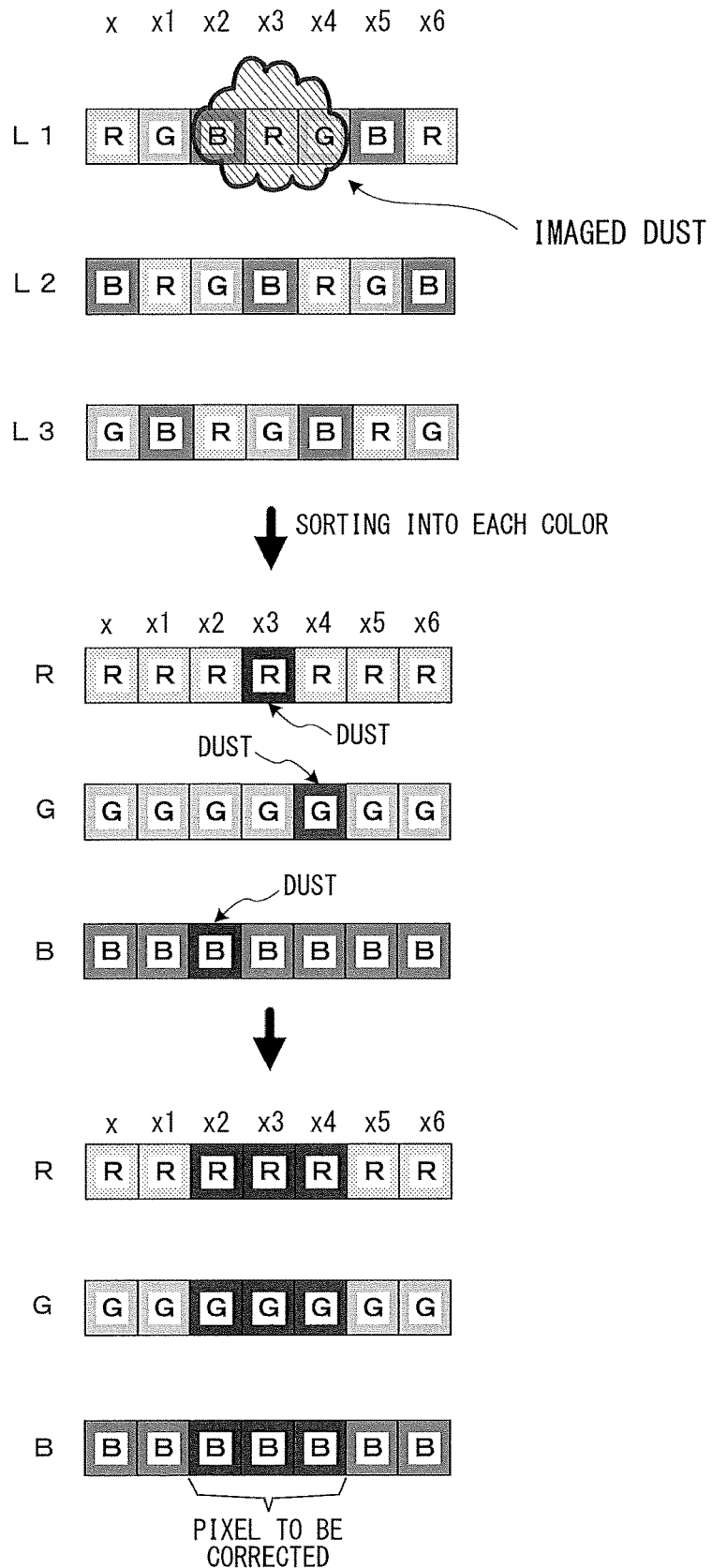
FIG. 23 is an explanatory diagram for illustrating a state of subjecting decomposed dust flags to OR processing among colors.

FIG. 23 is a schematic diagram for illustrating a case where pixels of other colors at the same pixel positions as the dust images divided to have a one-pixel width of the respective colors of R, G, and B are also set as the pixels to be corrected. When the dust is present at x2 (B), x3 (R), and x4 (G), R and G at the position of x2, G and B at the position of x3, and R and B at the position of x4 are also pixels to be corrected. When the pixels are viewed in each color, dust having a three-pixel width is obtained. Therefore, the pixel to be corrected becomes thick, and a trace of correction is more liable to remain as compared to a case where a pixel having a one-pixel width is corrected.

In view of this, in a third embodiment of the present invention, when the number of the pixels of the abnormal pixel (dust) satisfies a predetermined condition, for example, when a condition in which pixels corresponding to dust continue for a predetermined number or more in the main scanning direction (first direction) is satisfied, all of the abnormal pixels are corrected to pixels having the same color. Further, when the pixels corresponding to the dust continue for less than the predetermined number in the main scanning direction, correction is performed through use of pixels adjacent to the pixel for the pixel of each color. With this, unnecessary coloring can be reduced even when the dust having a two-pixel width or more is set as the pixel to be corrected, and the correction can be performed without forming a conspicuous trace of correction. Now, specific configuration examples for enabling such correction are described. The configuration of the image reading apparatus illustrated in FIG. 1, the configuration of the original reading unit 106 illustrated in FIG. 2, and the configuration of the line sensor 203 illustrated in FIG. 3 are similar to those of the first embodiment, and hence description thereof is omitted herein.

Figure 24:
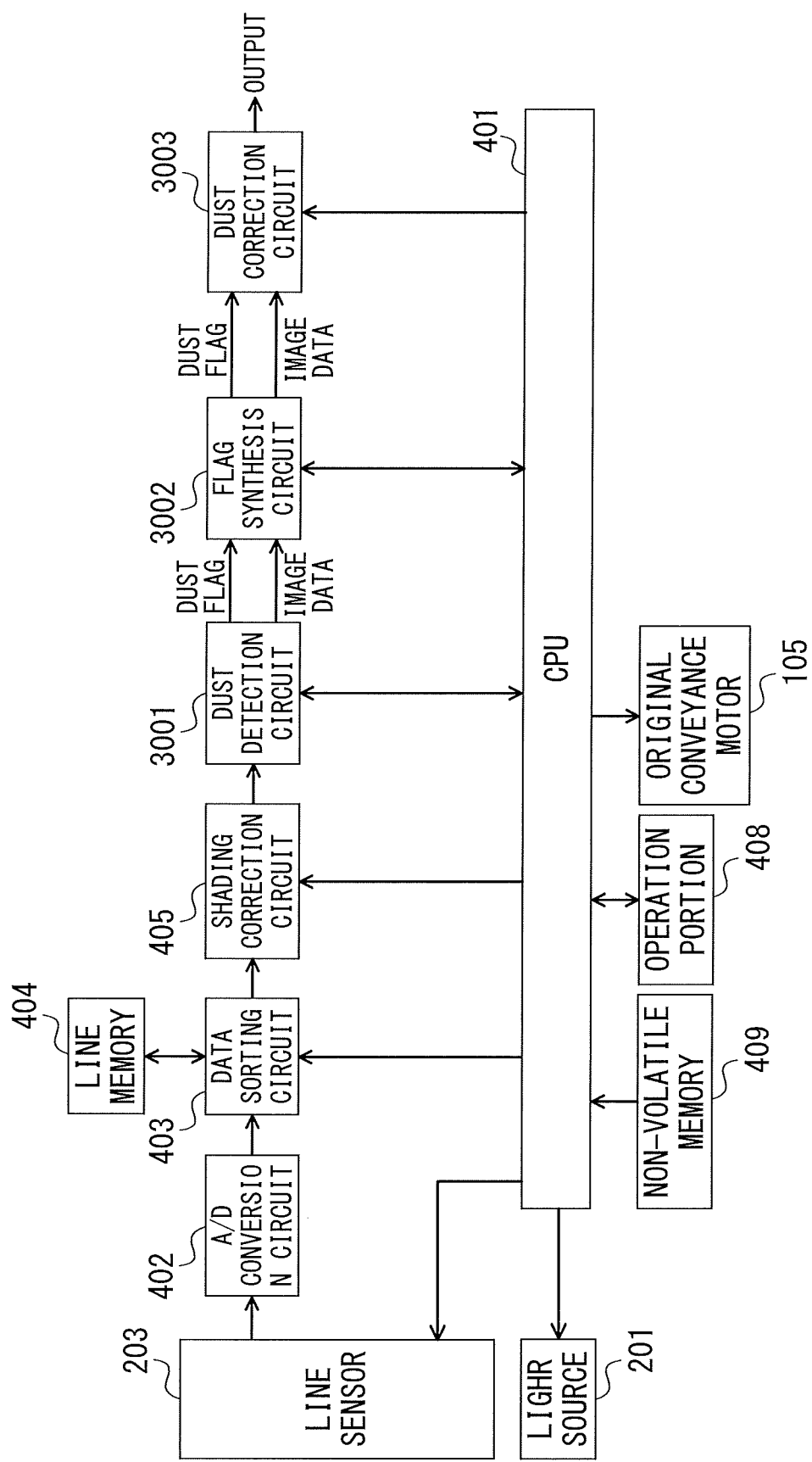
FIG. 24 is a block diagram of a control system of an image reading apparatus according to a third embodiment of the present invention.

FIG. 24 is a block diagram of the control system of the image reading apparatus according to the third embodiment. Components described in the first embodiment are denoted by like reference symbols. The third embodiment differs from the first embodiment in that a dust detection circuit 3001 and a flag synthesis circuit 3002 are provided as the dust detection means instead of the dust detection circuit 406. Further, the third embodiment differs from the first embodiment in that a dust correction circuit 3003 is provided as dust correction means instead of the dust correction circuit 407.

Figure 25:
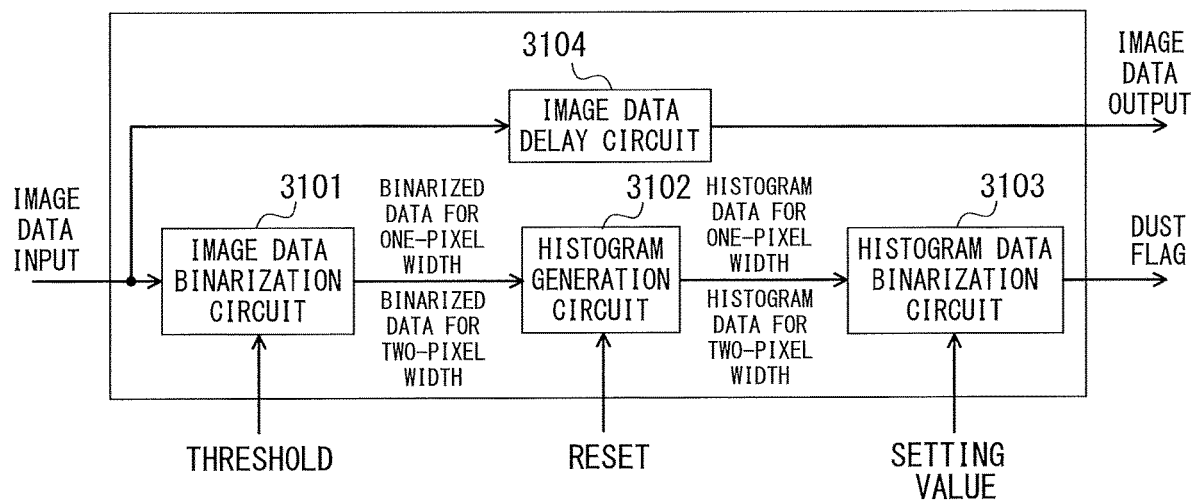
FIG. 25 is an internal block diagram of a dust detection circuit of the image reading apparatus according to the third embodiment.

FIG. 25 is an internal block diagram of the dust detection circuit 3001 of the image reading apparatus according to the third embodiment. The dust detection circuit 3001 includes an image data binarization circuit 3101, a histogram generation circuit 3102, and a histogram data binarization circuit 3103. The image data binarization circuit 3101 is configured to binarize the image data input from the shading correction circuit 405. That is, the image data binarization circuit 3101 is configured to set the image data that is equal to or less than a predetermined threshold, which is set by the CPU 401, to "1", and set other image data to "0". A different threshold can be set by the CPU 401 for the image data binarization circuit 3101 depending on the pixel width.

The histogram generation circuit 3102 is configured to generate histogram data by adding the binarized data output from the image data binarization circuit 3101 for each reading line during reading of the original. The histogram data is generated based on the pixel width. The histogram data can be reset by the CPU 401 to "0" as appropriate. The histogram data binarization circuit 3103 is configured to output, as a dust flag, a position at which the addition value of the histogram generation circuit 3102 exceeds a predetermined threshold set by the CPU 401 as "1", and output a position at which the addition value does not exceed the predetermined threshold as "0".

FIG. 26A to FIG. 26J are diagrams for illustrating the concept of the dust detection processing performed by the dust detection circuit 3001. In this case, for simplifying the description, description is only made of the R pixels, but the same applies to the G pixels and the B pixels. Further, for the sake of convenience, description is made of an example in which the widths of the dust image are a one-pixel width and a two-pixel width, but the third embodiment is also applicable to a dust image having a width of three pixels or more. Similarly to FIG. 5A and FIG. 5B, x in FIG. 26A to FIG. 26J corresponds to the pixel position of the line sensor 203. Further, the reading lines L1, L2, L3 L16 in the vertical direction represent the reading results of the light receiving element rows in the sub-scanning direction, which are read at different times.

FIG. 26A is the image data (digital values) of each reading line. As the numerical values become higher, the pixel becomes brighter, and as the numerical values become lower, a possibility that the pixel is an abnormal pixel (dust) becomes higher. For example, the digital value of the pixel at the position x4 in the main scanning direction of the reading line L1 is "22", and the possibility that the pixel is an abnormal pixel (dust) is high. FIG. 26B is an illustration of results of determining, by the image data binarization circuit 3101, whether or not the digital value of one pixel in the main scanning direction is equal to or less than a predetermined threshold. In this case, it is assumed that the threshold for one pixel is set to "30", and the pixels having digital values of "30" or less are displayed in a highlighted manner. FIG. 26C is an illustration of results of binarizing, by the image data binarization circuit 3101, the pixel whose digital value is "30" or less as "1" and other pixels as "0". FIG. 26D is an illustration of results of determining whether or not a value obtained by adding digital values of a width of two pixels adjacent to each other in the main scanning direction is equal to or less than a predetermined threshold in the digital values of the image data of FIG. 26A. The numerical value is a numerical value obtained by adding the digital values of a target pixel and a pixel adjacent to the target pixel on the right.

For example, the numerical value described at the position of x4 in the reading line L3 is "55", which is obtained by adding "22" being the digital value in the reading line L3 and "33" being the digital value at position x5 of the pixel adjacent on the right. That is, the digital value of the width of two pixels adjacent to each other in the main scanning direction is described. In this case, the threshold of the two-pixel width is set to "50", and the pixels having the added values that are equal to or less than "50" are displayed in a highlighted manner. FIG. 26E is results of binarizing, by the image data binarization circuit 3101, the pixel whose digital value of the two-pixel width is "50" or less as "1" and other pixels as "0". The binarized data for the one-pixel width and the binarized data for the two-pixel width are transmitted to the histogram generation circuit 3102 at the subsequent stage. The image data binarization circuit 3101 can perform the image data binarization processing in accordance with the pixel width in parallel.

FIG. 26F is histogram data for the one-pixel width, which is obtained by adding, by the histogram generation circuit 3102, binarized data for the one-pixel width illustrated in FIG. 26C in the sub-scanning direction. For example, at the position of x4, a total of 10 pixels in the sub-scanning direction are equal to or less than the threshold. Similarly, FIG. 26G is histogram data for the two-pixel width, which is obtained by adding, by the histogram generation circuit 3102, binarized data for the two-pixel width illustrated in FIG. 26E in the sub-scanning direction. For example, at the position of x8, a total of 10 pixels in the sub-scanning direction are equal to or less than the threshold. The histogram generation circuit 3102 transmits the histogram data for the one-pixel width and the histogram data for the two-pixel width to the histogram data binarization circuit 3103 at the subsequent stage.

FIG. 26H is an illustration of results obtained by binarizing, by the histogram data binarization circuit 3103, the histogram data for the one-pixel width illustrated in FIG. 26F. In this case, a threshold is set to "10" by the CPU 401, and the histogram data binarization circuit 3103 generates histogram binarized data for the one-pixel width in which the position at which the histogram data is "10" or more is set as "1" and other positions are set as "0". Similarly, FIG. 26I is an illustration of results obtained by binarizing, by the histogram data binarization circuit 3103, the histogram data for the two-pixel width illustrated in FIG. 26G. In this case, the threshold is set to "10" by the CPU 401, and the histogram data binarization circuit 3103 generates histogram binarized data for the two-pixel width in which the position at which the histogram data is "10" or more is set as "1" and other positions are set as "0". In this case, the histogram data for the two-pixel width is binarized such that the pixel adjacent on the right to the pixel being binarized as "1" is also "1". For example, the histogram data for the two-pixel width is binarized such that, when the position of x8 illustrated in FIG. 26I is "1", the position of x9 on the right is also "1".

Finally, the histogram binarized data for the one-pixel width and the histogram binarized data for the two-pixel width are added, and dust flags as illustrated in FIG. 26J are transmitted to the flag synthesis circuit 3002 at the subsequent stage. The dust flags represent four rows at x4, x8, x9, and x12 including dust at high possibility among the pieces of image data of 13 pixels in the main scanning direction and 16 reading lines in the sub-scanning direction illustrated in FIG. 26A.

An image data delay circuit 3104 delays the input image data by the same amount as the dust flag. A positional relationship between this image data and the dust flags output from the histogram data binarization circuit 3103 is output together to the subsequent-stage circuit.

Although not shown, three dust detection circuits 3001 illustrated in FIG. 25 are prepared for the image data of the R reading line, the G reading line, and the B reading line input from the shading correction circuit 405, and the three dust detection circuits 3001 operate in parallel. With this, abnormal pixels (dust) having the one-pixel width and the two-pixel width in the R reading line, the G reading line, and the B reading line can be detected.

In the third embodiment, the binarization threshold for the two-pixel width is set to a value lower than two times the threshold for the one-pixel width set to the image data binarization circuit 3101. In this manner, adjustment is possible so that the dust having the one-pixel width can be more easily detected than the dust having the two-pixel width.

Figure 27:
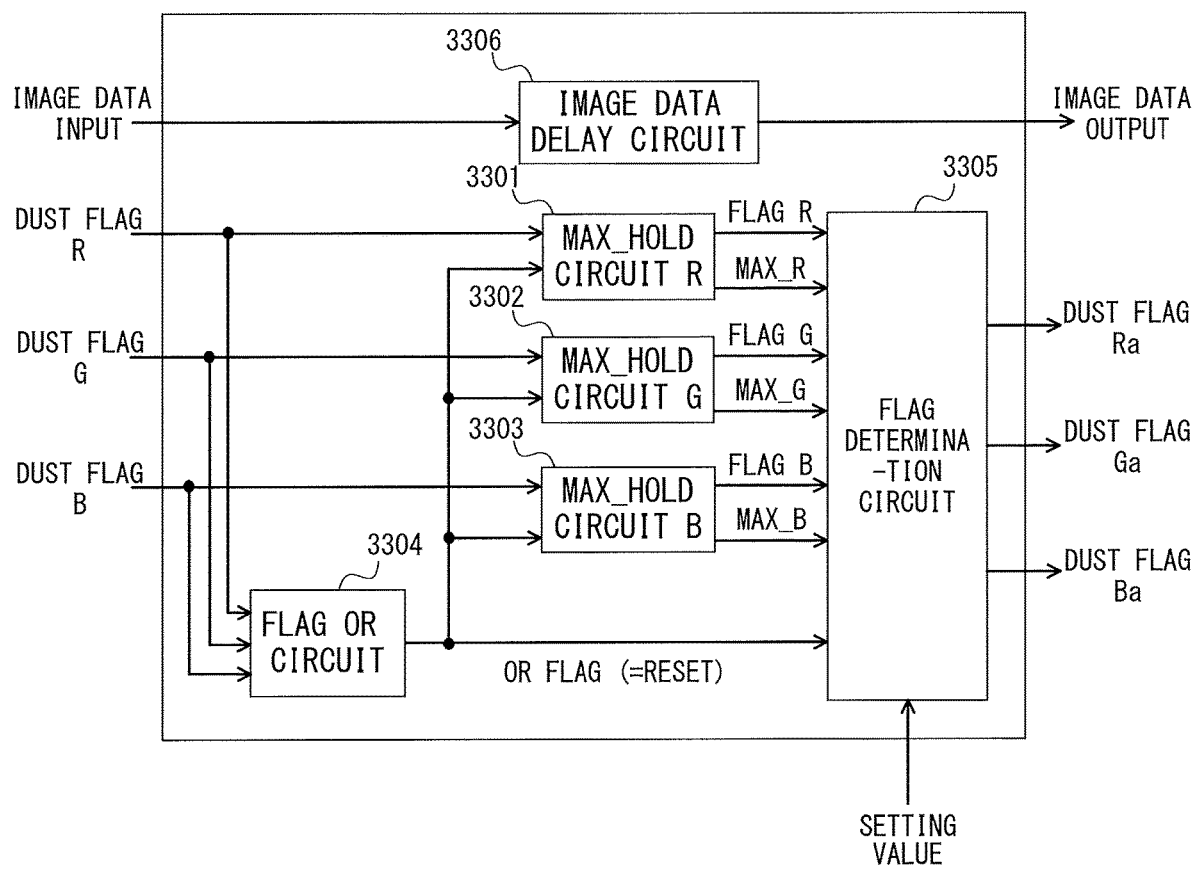
FIG. 27 is an internal block diagram of a flag synthesis circuit.

FIG. 27 is an internal block diagram of the flag synthesis circuit 3002. The image data, the dust flag R, the dust flag G, and the dust flag B, which are transmitted from the dust detection circuit 3001 at the previous stage, are input to the flag synthesis circuit 3002. The dust flag R is input to a MAX_HOLD circuit R 3301. The dust flag G is input to a MAX_HOLD circuit G 3302. The dust flag B is input to a MAX_HOLD circuit B 3303. Further, the dust flag R, the dust flag G, and the dust flag B are simultaneously input also to a flag OR circuit 3304. The flag OR circuit 3304 is configured to subject the input dust flag R, dust flag G, and dust flag B to logical OR operation at each pixel position in the main scanning direction, to thereby output a dust flag subjected to the logical OR operation. Such a dust flag is called "OR flag". The OR flag is transmitted to a flag determination circuit 3305 at the subsequent stage and to the MAX_HOLD circuits 3301, 3302, and 3303 of the respective colors.

The MAX_HOLD circuits 3301, 3302, and 3303 of the respective colors are configured to acquire maximum-width information (MAX_R, MAX_G, and MAX_B) of the dust flags of the respective colors input in a period in which the OR flag is input. Further, the MAX_HOLD circuits 3301, 3302, and 3303 are configured to transmit the maximum-width information together with the input dust flags of the respective colors to the flag determination circuit 3305 at the subsequent stage. The flag determination circuit 3305 is configured to compare the maximum-width information (MAX_R, MAX_G, and MAX_B) transmitted from the MAX_HOLD circuits 3301, 3302, and 3303 of the respective colors with a flag determination threshold set by the CPU 401. Further, the flag determination circuit 3305 is configured to determine whether the dust flags of the respective colors are directly output or replaced with the OR flag to be output based on the flag determination threshold.

Figure 28A:
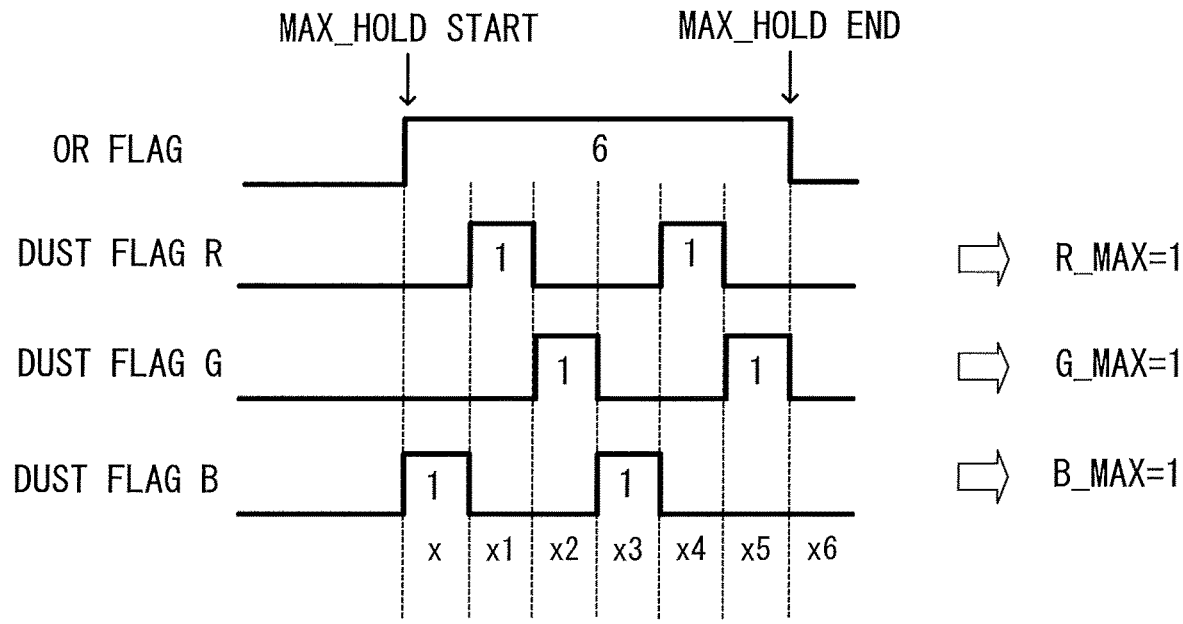
FIG. 28A and FIG. 28B are time charts for illustrating operation examples of the flag synthesis circuit.
Figure 28B:
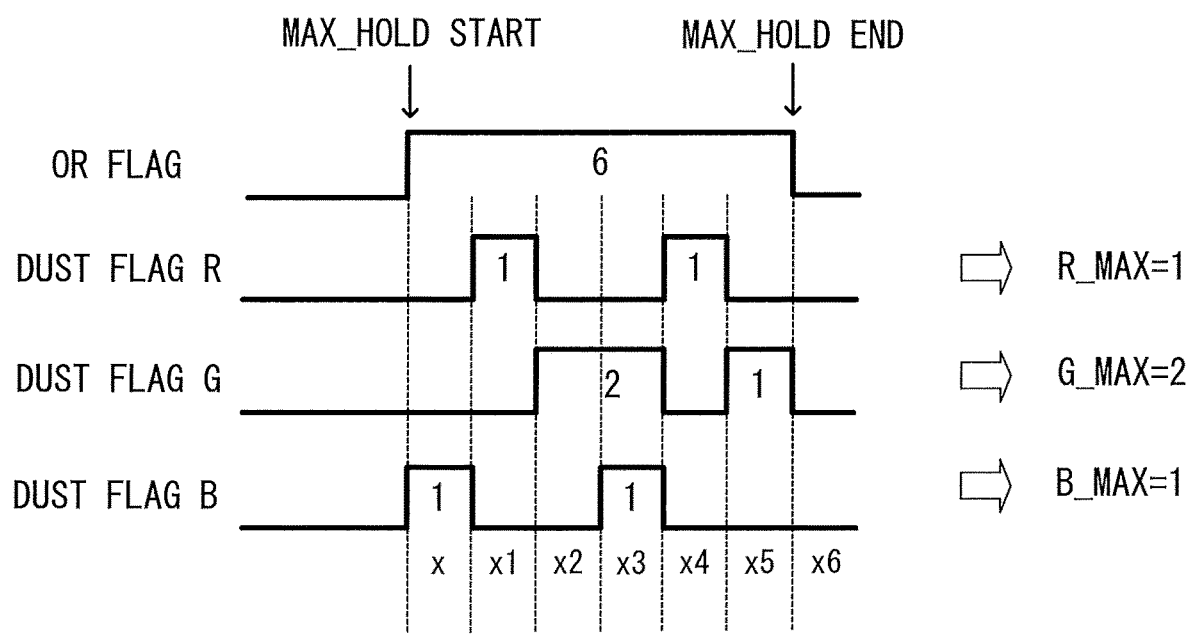

FIG. 28A and FIG. 28B are time charts for illustrating the operations of the flag synthesis circuit 3002. FIG. 28A is an example in which only the flag representing the one-pixel width is input. The dust flag R, the dust flag G, and the dust flag B of FIG. 28A represent dust flags of the respective colors to be input to the MAX_HOLD circuits 3301, 3302, and 3303 corresponding to the above-mentioned respective colors and to the flag OR circuit 3304. Further, the OR flag represents the OR flag to be output from the flag OR circuit 3304. In FIG. 28A and FIG. 28B, x represents the position of the individual light receiving elements of the line sensor 203. Respective flags are input in the order of flags having smaller x to the MAX_HOLD circuits 3301, 3302, and 3303 of the respective colors and to the flag OR circuit 3304. That is, x is equivalent to time, and can be replaced with time.

Referring to FIG. 28A, the dust flag B at the main scanning position x is input to the MAX_HOLD circuit B 3302 and the flag OR circuit 3304. The flag OR circuit 3304 subjects the dust flags of the respective colors to logical OR operation. Therefore, the OR flag is at a "High" level, and is output to the MAX_HOLD circuits 3301, 3302, and 3303 of the respective colors. The MAX_HOLD circuits 3301, 3302, and 3303 of the respective colors store the maximum widths of the input dust flags of the respective colors from the timing at which the above-mentioned OR flag is input. For example, at the timing at which the dust flag at the position of x5 is input, the R maximum value (R_MAX), the G maximum value (G_MAX), and the B maximum value (B_MAX) are all stored as "1". When the output of the OR flag is ended at the position of x6 at which there is no output of dust flags of all colors, the MAX_HOLD circuits 3301, 3302, and 3303 of the respective colors output the maximum widths of the dust flags of the respective colors at this time point to the flag determination circuit 3305 at the subsequent stage. After that, the MAX_HOLD circuits 3301, 3302, and 3303 of the respective colors reset the information on the maximum width stored as described above to "0" at the timing at which the next OR flag is input.

FIG. 28B is an operation example of a case where a flag representing a two-pixel width is input. In the example of FIG. 28B, at the timing of x6 at which the input of the OR flag is ended, the MAX_HOLD circuits 3301, 3302, and 3303 of the respective colors store the maximum widths of the respective colors at the time point. That is, the R maximum value (R_MAX), the G maximum value (G_MAX), and the B maximum value (B_MAX) are stored as "1", "2", and "1", respectively, and those values are output to the flag determination circuit 3305 at the subsequent stage.

Next, the flag determination circuit 3305 is described. The flag determination circuit 3305 is configured to store the dust flag of each color, the OR flag, and the maximum width of each color for one reading line. The dust flag corresponds to the dust flag R, the dust flag G, and the dust flag B output from the MAX_HOLD circuits 3301, 3302, and 3303 of the respective colors. The OR flag corresponds to the flag output from the flag OR circuit 3304. The maximum width of each color corresponds to the corresponding R maximum width (R_MAX), G maximum width (G_MAX), or B maximum width (B_MAX).

Figure 29:
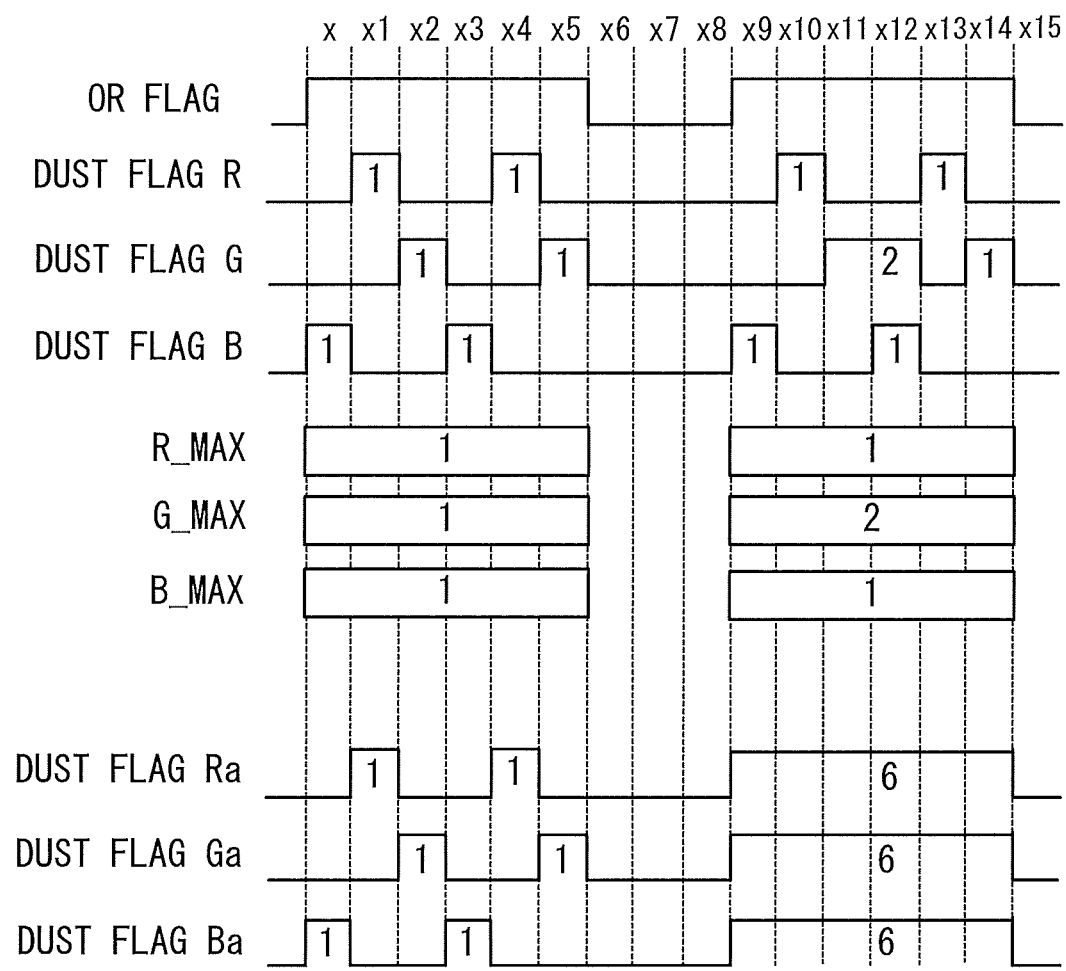
FIG. 29 is a time chart for illustrating an operation example of flag determination.

FIG. 29 is an illustration of the operation timing of the flag determination circuit 3305. The dust flags for 16 pixels at x to x15 are illustrated in the main scanning direction. The dust flag R, the dust flag G, the dust flag B, the OR flag, R_MAX, G_MAX, and B_MAX are each a flag for one reading line, which is stored in a memory (not shown) in the flag determination circuit 3305. The flag determination circuit 3305 performs flag determination based on those flags and on a flag determination threshold set by the CPU 401, to thereby perform an operation of replacing the flag when the value is equal to or more than the flag determination threshold (when a predetermined condition is satisfied). A dust flag Ra, a dust flag Ga, and a dust flag Ba are dust flags of the respective colors obtained after the replacement.

For example, it is assumed that the flag determination threshold is set to "2". That is, when any one of R_MAX, G_MAX, and B_MAX is "2" or more, the flag determination circuit 3305 replaces the flag of each color of R, G, and B at the corresponding position with the OR flag. Meanwhile, when all of R_MAX, G_MAX, and B_MAX are "1" or less, the flag determination circuit 3305 directly allocates the input dust flag R, dust flag G, and dust flag B. In the example of FIG. 29, the original dust flag R, dust flag G, and dust flag B are directly allocated at positions of x to x5, and the flags are replaced with the OR flag at the positions of x9 to x15. After that, the flag determination circuit 3305 transmits the dust flag Ra, the dust flag Ga, and the dust flag Ba obtained after the replacement to the dust correction circuit 3003 at the subsequent stage.

An image data delay circuit 3306 delays the image data by the same amount as the dust flag. A positional relationship between this image data and the dust flags is output together to the subsequent-stage circuit. The dust correction circuit 3003 determines that the dust is present at the position of the dust flag (dust flag Ra, dust flag Ga, or dust flag Ba) transmitted from the flag synthesis circuit 3002, and corrects the pixel at the position through linear interpolation based on pixels adjacent to the position on the right and left.

In this manner, according to the image reading apparatus of the third embodiment, when the linear interpolation is performed through the use of adjacent pixels, a part to which thick dust adheres, which is liable to cause coloring, can be corrected for all colors in common, and a part to which thin dust adheres, which is less liable to cause coloring, can be corrected for each color. With this, correction can be performed while reducing unnecessary coloring and without forming a conspicuous trace of correction.

As described above, the abnormal pixel can be detected with high accuracy, and false detection of the abnormal image can be effectively suppressed. In the above-mentioned embodiments, description is made with reference to the electrophotographic image forming apparatus, but the present invention may be applied to, for example, an ink-jet printer configured to eject ink to form an image on a sheet.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-096752, filed May 13, 2016 which is hereby incorporated by reference herein in its entirety.

What is claimed is:

1. An image reading apparatus, comprising:
a stacking portion on which a document is to be stacked;
a conveying unit configured to convey the document stacked on the stacking portion in a conveying direction;
a reading unit including a transparent member and a sensor including a first line sensor, a second line sensor, and a third line sensor, the reading unit being configured to read an image of the document conveyed by the conveying unit through the transparent member by using the sensor; and
a processor,
wherein the first line sensor includes a first light receiving element which receives light of a first color, a second light receiving element which receives light of a second color that is different from the first color, and a third light receiving element which receives light of a third color that is different from both the first color and the second color, the first light receiving element, the second light receiving element and the third light receiving element being arranged in a first direction,
wherein the second line sensor includes a fourth light receiving element which receives light of the first color, a fifth light receiving element which receives light of the second color, and a sixth light receiving element which receives light of the third color, the fourth light receiving element, the fifth light receiving element and the sixth light receiving element being arranged in the first direction,
wherein the third line sensor includes a seventh light receiving element which receives light of the first color, an eighth light receiving element which receives light of the second color, and a ninth light receiving element which receives light of the third color, the seventh light receiving element, the eighth light receiving element and the ninth light receiving element being arranged in the first direction,
wherein the first line sensor, the second line sensor, and the third line sensor are arranged at a predetermined interval in a second direction orthogonal to the first direction,
wherein, in the first line sensor, the first light receiving element is provided at a first position in the first direction, the second light receiving element is provided at a second position in the first direction and is adjacent to the first light receiving element in the first direction at one side of the first light receiving element, and the third light receiving element is provided at a third position in the first direction and is adjacent to the second light receiving element in the first direction at the one side of the second light receiving element,
wherein, the sixth light receiving element is provided at the first position in the first direction in the second line sensor, and the eighth light receiving element is provided at the first position in the first direction in the third line sensor,
wherein, the fourth light receiving element is provided at the second position in the first direction in the second line sensor, and the ninth light receiving element is provided at the second position in the first direction in the third line sensor,
wherein, the fifth light receiving element is provided at the third position in the first direction in the second line sensor, and the seventh light receiving element is provided at the third position in the first direction in the third line sensor;
wherein the processor operates to:
generate pixel data which is data of pixel representing an image corresponding to reading result of the reading unit;
determine an abnormal pixel of the first color based on pixel data corresponding to the first light receiving element, pixel data corresponding to the fourth light receiving element, and pixel data corresponding to the seventh light receiving element, each of pixel data corresponding to the first color related to an image of a fourth position on the document in the conveying direction;
determine an abnormal pixel of the second color based on pixel data corresponding to the second light receiving element, pixel data corresponding to the fifth light receiving element, and pixel data corresponding to the eighth light receiving element, each of pixel data corresponding to the second color related to an image of the fourth position on the document in the conveying direction;
determine an abnormal pixel of the third color based on pixel data corresponding to the third light receiving element, pixel data corresponding to the sixth light receiving element, and pixel data corresponding to the ninth light receiving element, each of pixel data corresponding to the third color related to an image of the fourth position on the document in the conveying direction;
correct, in the image corresponding to the reading result of the reading unit, pixel data of a first pixel, which is a pixel of the first color determined to be the abnormal pixel, based on the pixel data of pixel of the first color adjacent to the first pixel in a direction corresponding to the first direction,
correct, in the image corresponding to the reading result of the reading unit, pixel data of a second pixel, which is a pixel of the second color determined to be the abnormal pixel, based on the pixel data of pixel of the second color adjacent to the second pixel in a direction corresponding to the first direction, and correct, in the image corresponding to the reading result of the reading unit, pixel data of a third pixel, which is a pixel of the third color determined to be the abnormal pixel, based on the pixel data of pixel of the third color adjacent to the third pixel in a direction corresponding to the first direction.

2. The image reading apparatus according to claim 1, wherein the processor operates to determine a pixel corresponding to a light receiving element which is adjacent to, in the first direction, the light receiving element corresponding to a pixel determined to be the abnormal pixel as an abnormal pixel.

3. The image reading apparatus according to claim 1,
wherein the processor operates to determine an abnormal candidate pixel which is a candidate for an abnormal pixel of the first color based on the pixel data of the pixel of the first color, and wherein the processor operates to determine, in the image corresponding to the reading result of the reading unit, the abnormal candidate pixel in a first pixel region, which is an region of continuous abnormal candidate pixels of the first color, to be the abnormal pixel in a case where a width, in a direction corresponding to the first direction, of the first pixel region is smaller than a predetermined width and the number of continuous abnormal candidate pixels in a direction corresponding to the second direction in the first pixel region is larger than a predetermined number, wherein the processor operates to determine an abnormal candidate pixel which is a candidate for an abnormal pixel of the second color based on the pixel data of the pixel of the second color, wherein the processor operates to determine, in the image corresponding to the reading result of the reading unit, the abnormal candidate pixel in a second pixel region, which is an region of continuous abnormal candidate pixels of the second color, to be the abnormal pixel in a case where a width, in a direction corresponding to the first direction, of the second pixel region is smaller than a predetermined width and the number of continuous abnormal candidate pixels in a direction corresponding to the second direction in the second pixel region is larger than a predetermined number, wherein the processor operates to determine an abnormal candidate pixel which is a candidate for an abnormal pixel of the third color based on the pixel data of the pixel of the third color, and wherein the processor operates to determine, in the image corresponding to the reading result of the reading unit, the abnormal candidate pixel in a third pixel region, which is an region of continuous abnormal candidate pixels of the third color, to be the abnormal pixel in a case where a width, in a direction corresponding to the first direction, of the third pixel region is smaller than a predetermined width and the number of continuous abnormal candidate pixels in a direction corresponding to the second direction in the third pixel region is larger than a predetermined number.

4. The image reading apparatus according to claim 3,
wherein the processor operates not to determine, in the image read by the reading unit, the abnormal candidate pixel in the first pixel region to be the abnormal pixel in a case where the width, in the direction corresponding to the first direction, of the first pixel region is larger than the predetermined width, wherein the processor operates not to determine, in the image read by the reading unit, the abnormal candidate pixel in the second pixel region to be the abnormal pixel in a case where the width, in the direction corresponding to the first direction, of the second pixel region is larger than the predetermined width, wherein the processor operates not to determine, in the image read by the reading unit, the abnormal candidate pixel in the third pixel region to be the abnormal pixel in a case where the width, in the direction corresponding to the first direction, of the third pixel region is larger than the predetermined width.

5. The image reading apparatus according to claim 3,
wherein the processor operates, for each of the pixel data of the first color, the pixel data of the second color, and the pixel data of the third color, to determine a pixel corresponding to pixel data having a value smaller than a predetermined value as the abnormal candidate pixel.

6. The image reading apparatus according to claim 1,
wherein the pixel data is data which represents intensity of light received by a light receiving element of the first line sensor, the second line sensor, or the third line sensor.

7. The image reading apparatus according to claim 1,
wherein the first color is red, the second color is green, and the third color is blue.

8. The image reading apparatus according to claim 1,
wherein the image corresponding to the reading result of the reading unit is formed by reading an image on the document at the same position in the conveying direction by the first line sensor, the second line sensor and the third line sensor.

9. An image forming apparatus, comprising:
an image reading apparatus according to claim 1; and
an image forming unit configured to form an image on an image forming medium based on the reading result of the image reading apparatus.

10. An image forming apparatus, comprising:
an image reading apparatus; and
an image forming unit configured to form an image on an image forming medium,
wherein the image reading apparatus includes:
a stacking portion on which a document is to be stacked;
a conveying unit configured to convey the document stacked on the stacking portion in a conveying direction;
a reading unit including a transparent member and a sensor including a first line sensor, a second line sensor, and a third line sensor, the reading unit being configured to read an image of the document conveyed by the conveying unit through the transparent member by using the sensor; and
a processor,
wherein the first line sensor includes a first light receiving element which receives light of a first color, a second light receiving element which receives light of a second color that is different from the first color, and a third light receiving element which receives light of a third color that is different from both the first color and the second color, the first light receiving element, the second light receiving element and the third light receiving element being arranged in a first direction, wherein the second line sensor includes a fourth light receiving element which receives light of the first color, a fifth light receiving element which receives light of the second color, and a sixth light receiving element which receives light of the third color, the fourth light receiving element, the fifth light receiving element and the sixth light receiving element being arranged in the first direction, wherein the third line sensor includes a seventh light receiving element which receives light of the first color, an eighth light receiving element which receives light of the second color, and a ninth light receiving element which receives light of the third color, the seventh light receiving element, the eighth light receiving element and the ninth light receiving element being arranged in the first direction, wherein the first line sensor, the second line sensor, and the third line sensor are arranged at a predetermined interval in a second direction orthogonal to the first direction, wherein, in the first line sensor, the first light receiving element is provided at a first position in the first direction, the second light receiving element is provided at a second position in the first direction and is adjacent to the first light receiving element in the first direction at one side of the first light receiving element, and the third light receiving element is provided at a third position in the first direction and is adjacent to the second light receiving element in the first direction at the one side of the second light receiving element, wherein, the sixth light receiving element is provided at the first position in the first direction in the second line sensor, and the eighth light receiving element is provided at the first position in the first direction in the third line sensor, wherein, the fourth light receiving element is provided at the second position in the first direction in the second line sensor, and the ninth light receiving element is provided at the second position in the first direction in the third line sensor, wherein, the fifth light receiving element is provided at the third position in the first direction in the second line sensor, and the seventh light receiving element is provided at the third position in the first direction in the third line sensor;

wherein the processor operates to:

generate pixel data which is data of pixel representing an image corresponding to reading result of the reading unit;

determine an abnormal pixel of the first color based on pixel data corresponding to the first light receiving element, pixel data corresponding to the fourth light receiving element, and pixel data corresponding to the seventh light receiving element, each of pixel data corresponding to the first color related to an image of a fourth position on the document in the conveying direction;

determine an abnormal pixel of the second color based on pixel data corresponding to the second light receiving element, pixel data corresponding to the fifth light receiving element, and pixel data corresponding to the eighth light receiving element, each of pixel data corresponding to the second color related to an image of the fourth position on the document in the conveying direction;

determine an abnormal pixel of the third color based on pixel data corresponding to the third light receiving element, pixel data corresponding to the sixth light receiving element, and pixel data corresponding to the ninth light receiving element, each of pixel data corresponding to the third color related to an image of the fourth position on the document in the conveying direction;

correct, in the image corresponding to the reading result of the reading unit, pixel data of a first pixel, which is a pixel of the first color determined to be the abnormal pixel, based on the pixel data of pixel of the first color adjacent to the first pixel in a direction corresponding to the first direction, correct, in the image corresponding to the reading result of the reading unit, pixel data of a second pixel, which is a pixel of the second color determined to be the abnormal pixel, based on the pixel data of pixel of the second color adjacent to the second pixel in a direction corresponding to the first direction, and correct, in the image corresponding to the reading result of the reading unit, pixel data of a third pixel, which is a pixel of the third color determined to be the abnormal pixel, based on the pixel data of pixel of the third color adjacent to the third pixel in a direction corresponding to the first direction;

wherein the image forming unit is configured to form an image on an image forming medium in accordance with the pixel data as corrected by the processor.

* * * * *